US012699062B2

(12) United States Patent
Ito

(10) Patent No.: US 12,699,062 B2
(45) Date of Patent: Aug. 4, 2026

(54) ANALYSIS APPARATUS, ANALYSIS METHOD, AND ANALYSIS PROGRAM

(71) Applicant: Rigaku Corporation, Tokyo (JP)

(72) Inventor: Yoshiyasu Ito, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 260 days.

(21) Appl. No.: 18/611,741

(22) Filed: Mar. 21, 2024

(65) Prior Publication Data

US 2024/0319121 A1 Sep. 26, 2024

(30) Foreign Application Priority Data

Mar. 23, 2023 (JP) ................................. 2023-047057

(51) Int. Cl.
*G01N 23/201* (2018.01)
*G01N 23/20025* (2018.01)

(52) U.S. Cl.
CPC ..... *G01N 23/201* (2013.01); *G01N 23/20025* (2013.01); *G01N 2223/041* (2013.01); *G01N 2223/054* (2013.01)

(58) Field of Classification Search
CPC ........ G01B 15/04; G01B 15/02; G01B 15/08; G01B 2210/56
See application file for complete search history.

(56) References Cited

U.S. PATENT DOCUMENTS 9,915,522 B1 * 3/2018 Jiang ..................... G01B 11/02
11,131,637 B2 9/2021 Ito et al.

11,181,489 B2 11/2021 Thompson et al.
11,408,837 B2 8/2022 Ito et al.
2008/0219409 A1 * 9/2008 Ueda ...................... G01B 15/02
378/89
2010/0278304 A1 * 11/2010 Mukaide ................ A61B 6/484
378/53
2015/0085983 A1 * 3/2015 Harding ................. G01V 5/222
378/87
2016/0320320 A1 * 11/2016 Yun ...................... G01N 23/207
2017/0307548 A1 * 10/2017 Bykanov ................. G21K 1/04
2017/0363550 A1 * 12/2017 Kobayashi ....... G01N 23/20008
(Continued)

FOREIGN PATENT DOCUMENTS

JP 7100897 B2 7/2022
JP 7168985 B2 11/2022
WO 2020/028412 A1 2/2020

*Primary Examiner* — David J Makiya
*Assistant Examiner* — Soorena Kefayati
(74) *Attorney, Agent, or Firm* — XSENSUS LLP

(57) ABSTRACT

An analysis apparatus includes processing circuitry configured to store data of a scattering intensity measured by transmission of X-rays in one ω scan, perform coordinate conversion from the coordinate of the scattering vector to the coordinate of the tilt of the scattering body, with respect to a waveform based on the intensity of a specific diffraction point on the two-direction components, specify a peak position of the waveform of the intensity with respect to the coordinate of the tilt applied the coordinate conversion, and calculate a difference between the specified peak position and the peak position obtained on the assumption that the scattering body is not tilted from the direction perpendicular to the surface of the plate-shaped sample.

18 Claims, 25 Drawing Sheets

(56)             References Cited

U.S. PATENT DOCUMENTS

| | | | | |
|---|---|---|---|---|
| 2017/0370860 | A1* | 12/2017 | Konaka | G01N 23/20008 |
| 2018/0106735 | A1* | 4/2018 | Gellineau | G01B 15/04 |
| 2020/0041426 | A1* | 2/2020 | Thompson | G01N 23/201 |
| 2020/0333267 | A1* | 10/2020 | Ito | G01N 23/201 |
| 2020/0333268 | A1* | 10/2020 | Ito | G01B 15/04 |
| 2021/0080409 | A1* | 3/2021 | Wang | G01N 23/201 |
| 2021/0262950 | A1* | 8/2021 | Blasenheim | G03F 7/70625 |
| 2021/0364454 | A1* | 11/2021 | Hoghoj | G01N 23/201 |

* cited by examiner

UNIT LATTICE OF HOLE PATTERN

DETERMINING X COMPONENT OF TILT $\left(Q_Y = 0nm^{-1}\right)$

COORDINATE CONVERSION : $\theta_X = -\tan^{-1}\left(\frac{Q_Z}{Q_X}\right)$

DETERMINING Y COMPONENT OF TILT $\left( Q_X = 0nm^{-1} \right)$

COORDINATE CONVERSION $\theta_Y = -\tan^{-1}\left( \frac{Q_Z}{Q_Y} \right)$

DETERMINING X COMPONENT OF TILT $(Q_X \neq 0nm^{-1})$

COORDINATE CONVERSION :

| Cycle | $T_X$(deg) | $T_Y$(deg) |
|---|---|---|
| 0.5 | -0.6471 | 0.0000 |
| 1 | -0.6471 | 1.0290 |
| 1.5 | -0.8520 | 1.0290 |
| 2 | -0.8520 | 1.0774 |
| 2.5 | -0.8637 | 1.0774 |
| 3 | -0.8637 | 1.0802 |
| 3.5 | -0.8643 | 1.0802 |
| 4 | -0.8643 | 1.0803 |
| 4.5 | -0.8643 | 1.0803 |
| 5 | -0.8643 | 1.0803 |
| 5.5 | -0.8644 | 1.0803 |
| 6 | -0.8644 | 1.0803 |
| 6.5 | -0.8644 | 1.0803 |
| 7 | -0.8644 | 1.0803 |
| 7.5 | -0.8644 | 1.0803 |
| 8 | -0.8644 | 1.0803 |

INDEPENDENT ANALYSIS OF $\theta_X$ $(Q_Y = 0\ nm^{-1})$

COORDINATE CONVERSION : $\theta_X = -\tan^{-1}\left(\frac{Q_Z}{Q_X}\right)$

○    Experimental
——    Calculation
$T_X = -0.865\ deg$ (-1 0)
(1 0)
(-2 0)
(2 0)
(-3 0)
(3 0)
(-4 0)
(4 0)
(-5 0)
(5 0)

$\theta_X$ (deg)

INDEPENDENT ANALYSIS OF $\theta_Y$ $(Q_X = 0\ nm^{-1})$

COORDINATE CONVERSION: $\theta_Y = -\tan^{-1}\left(\frac{Q_X}{Q_Y}\right)$

LOOP ANALYSIS OF $\theta_X$ AND $\theta_Y$ $(Q_x != 0 \text{ nm}^{-1})$

COORDINATE CONVERSION : $\theta_x = -\tan^{-1}\left(\frac{Q_z + Q_y \tan\theta_Y}{Q_x}\right)$ LOOP ANALYSIS OF $\theta_X$ AND $\theta_Y$ $(Q_Y != 0 \text{ nm}^{-1})$ COORDINATE CONVERSION : $\theta_Y = -\tan^{-1}\left(\frac{Q_Z + Q_X \tan\theta_X}{Q_Y}\right)$ SINGLE ANALYSIS OF $\theta_X$ $(Q_Y = 0 \text{ nm}^{-1})$ COORDINATE CONVERSION : $\theta_x = -\tan^{-1}\left(\frac{Q_z}{Q_x}\right)$ LOOP ANALYSIS OF $\theta_X$ AND $\theta_Y$ LOOP ANALYSIS OF $\theta_X$ AND $\theta_Y$ $(Q_Y \mathrel{!=} 0 \text{ nm}^{-1})$ COORDINATE CONVERSION : $\theta_Y = -\tan^{-1}\left(\dfrac{Q_Z + Q_X \tan\theta_X}{Q_Y}\right)$ SINGLE ANALYSIS OF $a_0$ (DIFFRACTION POINTS
PARALLEL TO DIRECT BEAM)

COORDINATE CONVERSION : $a_0 = \omega - \omega_0$

SINGLE ANALYSIS OF $a_1$ (ALL DIFFRACTED POINTS EXCEPT PARALLEL AND PERPENDICULAR TO DIRECT BEAM)

COORDINATE CONVERSION : $a_1 = \dfrac{\omega - \omega_0 - u_0}{\tan \theta_{hk}}$

ANALYSIS APPARATUS, ANALYSIS METHOD, AND ANALYSIS PROGRAM

CROSS-REFERENCE TO RELATED APPLICATION

This application claims priority from Japanese Patent Application No. 2023-047057, filed on Mar. 23, 2023, the entire contents of Japanese Patent Application No. 2023-047057 are incorporated herein by reference.

BACKGROUND

Technical Field

The present disclosure relates to an analysis apparatus, an analysis method, and an analysis program for analyzing a fine structure of a plate-shaped sample formed to have columnar scattering bodies that are long in a thickness direction and periodically arranged.

Description of the Related Art

Conventionally, transmission small-angle X-ray scattering (tSAXS) has been performed in order to non-destructively and easily measure a pattern shape for a semiconductor device which is three-dimensionally miniaturized by a deep groove pattern.

Then, as an application of this measurement method, for the columnar scattering bodies periodically arranged in the plate-shaped sample, a method of accurately specifying the shape by taking much time for measurement and analysis assuming a complex shape model with high adaptability (see Patent Document 1) and a method of measuring in a short time with low accuracy on the assumption of a simple shape model (see Patent Document 2) is known. In addition, a method of calculating the tilt of a scattering body from a measurement result obtained by scanning in two directions without a shape model has been proposed (see Patent Document 3).

PATENT DOCUMENT

Patent Document 1: JP-Patent No. 7100897
Patent Document 2: JP-Patent No. 7168985
Patent Document 3: International Publication No. 2020/028412

SUMMARY

In the actual inspection process of semiconductors, there occurs needs not only for analysis of complex shapes in which the method described in Patent Document 1 is effective. For example, only the tilt of the columnar scattering body with respect to the sample surface, there is a scene to be measured in a short time while maintaining the accuracy. The techniques described in Patent Documents 2 and 3 are characterized by simplicity and can meet this need to some extent. However, it is difficult to complete the measurement and analysis in a short time while measuring the tilt of the columnar scattering body by the two-direction components with high accuracy.

The present disclosure has been made in view of such circumstances, and exemplary embodiments of the present disclosure include an analysis apparatus, an analysis method, and an analysis program capable of measuring only the two-direction components of the tilt of the columnar scattering bodies periodically arranged in a plate-shaped sample at high speed with high accuracy.

(1) In an exemplary embodiment, the analysis apparatus of the present disclosure is an analysis apparatus for analyzing a fine structure of a plate-shaped sample formed to have columnar scattering bodies that are long in a thickness direction and periodically arranged, comprising a measurement data storing section for storing data of a scattering intensity from the plate-shaped sample measured by transmission of X-rays in one $\omega$ scan, a coordinate conversion section for performing coordinate conversion from the coordinate of the scattering vector to the coordinate of the tilt of the scattering body, with respect to a waveform based on the intensity of a specific diffraction point on the two-direction components, using the data of the measured scattering intensity, a peak position specifying section for specifying a peak position of the waveform of the intensity with respect to the coordinate of the tilt applied the coordinate conversion, and a tilt calculating section for r calculating the difference between the specified peak position and the peak position obtained on the assumption that the scattering body is not tilted from the direction perpendicular to the surface of the plate-shaped sample, on the two-direction components of the tilt of the scattering body.

(2) Further, in the analysis apparatus according to (1), the coordinate conversion section performs the coordinate conversion to the coordinate of the tilt of the scattering body on at least one of the two-direction components, by a single analysis using a diffraction point at which one of the two-direction components of the scattering vectors is 0.

(3) Further, in the analysis apparatus according to (1), the coordinate converting section performs the coordinate conversion to the coordinate of the tilt of the scattering body on the two-direction components, by a loop analysis using a diffraction point where none of the two-direction components of the scattering vectors is not 0.

(4) Further, in the analysis apparatus according to any one of (1) to (3), the two-direction components correspond to components in X direction and along with the unit cell and Y direction orthogonal to the X direction, both of the X and Y directions being parallel to the surface of the plate-shaped sample.

(5) Further, in the analysis apparatus according to any one of (1) to (3), the two-direction components correspond to components in $a_0$ direction and being the scanning direction of the $\omega$-scan and $a_1$ direction orthogonal to $a_0$ direction, both of the $a_0$ and $a_1$ directions being parallel to the surface of the plate-shaped sample.

(6) Further, in the analysis apparatus according to any one of (1) to (5), the coordinate conversion section uses a waveform integrated over a plurality of diffraction points as a waveform based on an intensity of a two-direction components of the specific diffraction point.

(7) Further, the analysis method of the present disclosure is an analysis method for a fine structure of a plate-shaped sample formed to have columnar scattering bodies that are long in a thickness direction and periodically arranged, comprising the following steps of preparing data of a scattering intensity from the plate-shaped sample measured by transmission of X-rays in one $\omega$ scan, performing coordinate conversion from the coordinate of the scattering vector to the coordinate of the tilt of the scattering body, with respect to a waveform based on the intensity of a specific diffraction point on the two-direction components, using the data of the measured scattering intensity, specifying a peak position of the waveform of the intensity with respect to the coordinate of the tilt applied the coordinate conversion, and calculating the difference between the specified peak position and the peak position obtained on the assumption that the scattering body is not tilted from the direction perpendicular to the surface of the plate-shaped sample, on the two-direction components of the tilt of the scattering body.

(8) Further, the analysis program of the present disclosure is an analysis program for analyzing a fine structure of a plate-shaped sample formed to have columnar scattering bodies that are long in a thickness direction and periodically arranged, causing a computer to execute the following processes of preparing data of a scattering intensity from the plate-shaped sample measured by transmission of X-rays in one ω scan, performing coordinate conversion from the coordinate of the scattering vector to the coordinate of the tilt of the scattering body, with respect to a waveform based on the intensity of a specific diffraction point on the two-direction components, using the data of the measured scattering intensity, specifying a peak position of the waveform of the intensity with respect to the coordinate of the tilt applied the coordinate conversion, and calculating the difference between the specified peak position and the peak position obtained on the assumption that the scattering body is not tilted from the direction perpendicular to the surface of the plate-shaped sample, on the two-direction components of the tilt of the scattering body.

DETAILED DESCRIPTION

Figure 1:
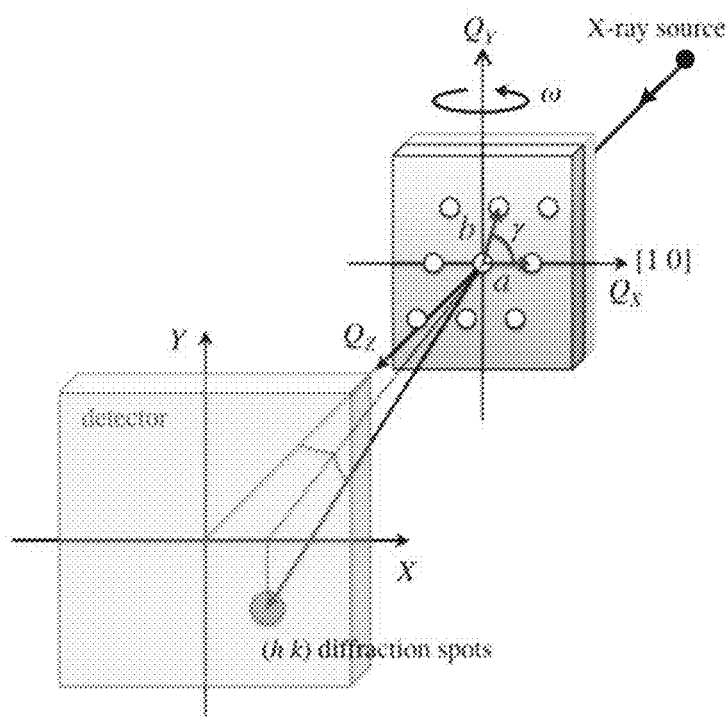
FIG. 1 illustrates a perspective view showing a measuring system of a transmission CD-SAXS.

Next, embodiments of the present disclosure are described with reference to the drawings. To facilitate understanding of the description, the same reference numerals are assigned to the same components in the respective drawings, and duplicate descriptions are omitted.

First Embodiment

[Transmittance CD-SAXS]

The present disclosure describes analyzing a fine structure of a plate-shaped sample formed to have columnar scattering bodies that are long in a thickness direction and periodically arranged and is applicable for calculating a tilt of the scattering body in the sample by a transmission CD-SAXS that can be performed at a laboratory level. In particular, the present disclosure describes analyzing shapes of semiconductor devices having fine processing patterns with deep grooves, such as three-dimensional NAND and DRAM. The present disclosure is effective for non-destructively and conveniently measuring fine patterns with deep grooves having a very large aspect ratio and is suitable for analyzing a structure embedded in a substrate. Measurement of the shape of the deep groove pattern is highly demanded even for three-dimensional semiconductor devices in recent years, and the present disclosure can greatly contribute to in-line measurement of the three-dimensional semiconductor device.

FIG. 1 is a perspective view showing a measuring system of a transmission CD-SAXS. In a transmission CD-SAXS, sample rotation (w rotation) is performed with respect to an orientation in which X-rays are incident perpendicularly to the sample surface, and the sample rotation angle dependency of the integrated intensity of the diffracted ray is measured. The purpose of rotating the sample is to change the scatter vector $Q_Z$ to acquire depth-direction data.

[Scattering Vector and Sample Structure]

Figures 2A, 2B:
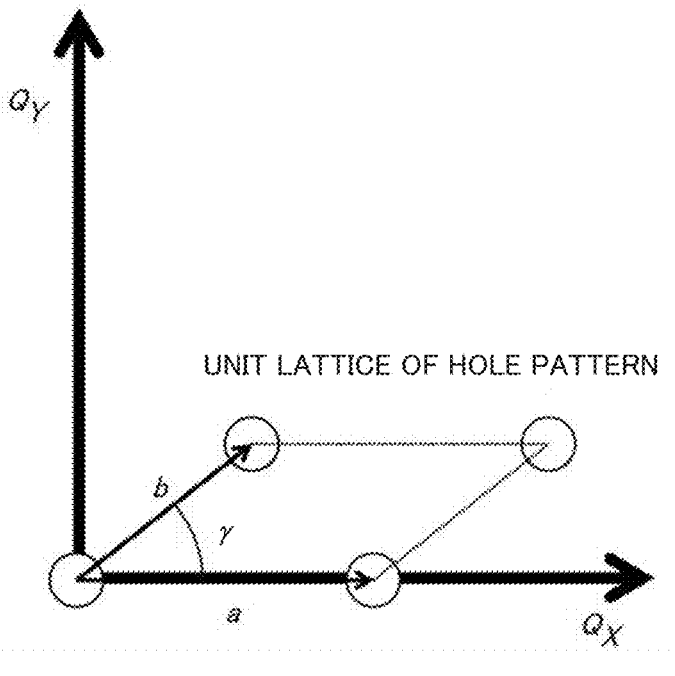
FIGS. 2A and 2B illustrate diagrams showing a unit cell of a hole pattern and a relationship between a silicon wafer and a lattice vector, respectively.

FIGS. 2A and 2B are diagrams showing a unit cell of a hole pattern and a relationship between a silicon wafer and a lattice vector, respectively. If there is a unit cell with lattice constants a and b and a lattice angle $\gamma$, the diffraction conditions of the diffraction index (h, k) are given using the scattering vector $Q_X$, $Q_Y$ and $Q_Z$.

$$\begin{cases} Q_X = 2\pi\dfrac{h}{a} \\[2mm] Q_Y = 2\pi\left(-\dfrac{h}{a\tan\gamma} + \dfrac{k}{b\sin\gamma}\right) \\[2mm] Q_Z \approx -Q_X\tan\omega \end{cases} \tag{1}$$

$Q_X$ can be defined as a scattering vector in a direction parallel to the a-axis of the unit cell, and $Q_Y$ can be defined as a scattering vector in a direction orthogonal to $Q_X$.

For example, in the case of a silicon wafer sample, a mark called a notch is provided to the sample, and the measurement is performed after XY directions of the sample are often aligned to the directions of the scatter vectors $Q_X$ and $Q_Y$. Hereinafter, basically, XY directions of the sample are assumed to be same as the directions of the scattered vector $Q_X$ and $Q_Y$.

When the a-axis is rotated by $\varphi$ with respect to the notch, the tilt angle ($\theta_{WX}$, $\theta_{WY}$) of the wafer reference can be calculated as follows.

$$\theta_{WX} = \theta_X\,\cos\phi - \theta_Y\,\sin\phi \tag{2}$$

$$\theta_{WY} = \theta_X\,\sin\phi + \theta_Y\,\cos\phi$$

[Tilt Angle and $Q_Z$ Waveform]

If the scattering body of the cylinder has a central axis in a direction perpendicular to the surface of the sample, the shape factor of the scattering body of the cylinder is expressed as:

$$F(Q, R_0, H) = 4\pi R_0\frac{J_1(R_0 Q_R)}{Q_R} \times \boxed{\frac{\sin\frac{H}{2}Q_Z}{Q_Z}} \tag{3}$$

In addition, the form factors of the cylindrical scattering bodies tilted by $\theta_X$ and $\theta_Y$ in $Q_X$ and $Q_Y$ directions, respectively, with respect to the surface, are expressed as follows.

$$F(Q, R_0, H, \theta_X, \theta_Y) = \tag{4}$$

$$4\pi R_0\frac{J_1(R_0 Q_R)}{Q_R} \times \boxed{\frac{\sin\frac{H}{2}(Q_X\tan\theta_X + Q_Y\tan\theta_Y + Q_Z)}{Q_X\tan\theta_X + Q_Y\tan\theta_Y + Q_Z}}$$

Considering the inside of the broken lines of the above formulas (2) and (3), when the scattering bodies are tilted by $\theta_X$ and $\theta_Y$ in $Q_X$ and $Q_Y$ directions, respectively, with respect to the surface of the sample, the wave form in $Q_Z$ direction is moved in parallel to $Q_Z$ direction by the following amounts.

$$\Delta Q_Z = -Q_X\tan\theta_X - Q_Y\tan\theta_Y \tag{5}$$

That is, $\theta_X$ and $\theta_Y$ can be obtained by extracting the deviation of $Q_Z$ waveforms for the respective diffraction points. When the deviation of $Q_Z$ waveform is calculated, it is easy to calculate the deviation of the center position. In this way, it is possible to determine the tilt angle of two axes without a model and at high speed with one scan data.

The following formulas can be derived as expressions representing $\theta_X$ and $\theta_Y$.

$$\theta_X = -\tan^{-1}\left(\frac{Q_Z + Q_Y\tan\theta_Y}{Q_X}\right) \tag{6}$$

$$\theta_Y = -\tan^{-1}\left(\frac{Q_Z + Q_X\tan\theta_X}{Q_Y}\right) \tag{7}$$

Figure 3:
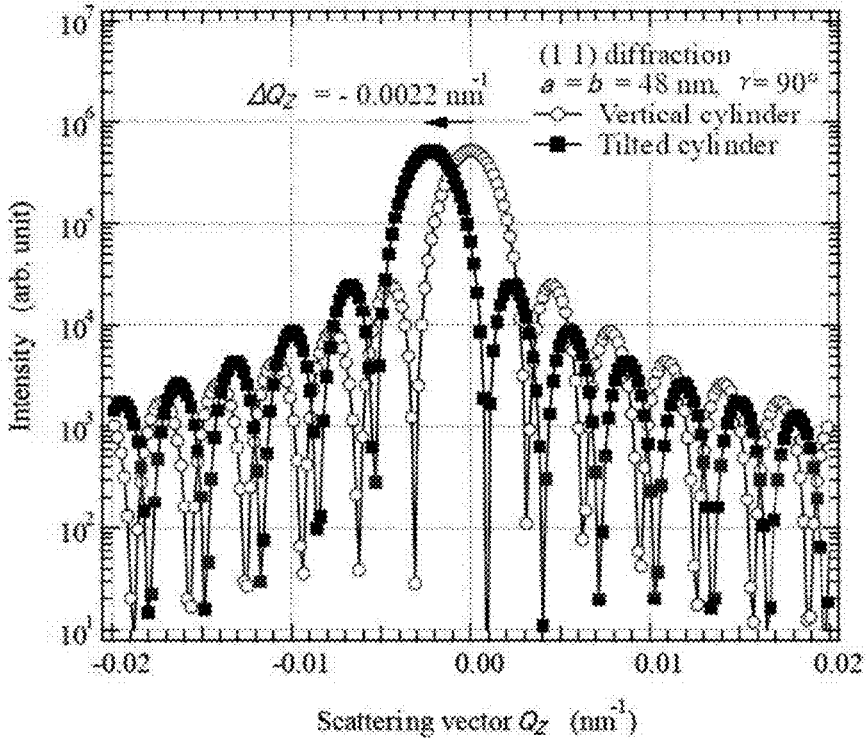
FIG. 3 illustrates a graph of a scatter intensity profile for $Q_Z$ of diffraction points.

In fact, the positions of $Q_Z$ waveforms differ between samples with and without a tilt in the scattering bodies. FIG. 3 is a graph of the scatter intensity profile for $Q_Z$ of diffraction points of (11). The plot of the circles represents $Q_Z$ waveform due to the cylindrical scattering bodies having the central axis perpendicular to the surface of the sample, and the plot of the squares represents $Q_Z$ waveform due to the cylindrical scattering bodies having the central axis tilted from the direction perpendicular to the surface of the sample. In the embodiment shown in FIG. 3, the difference $\Delta Q_Z$ between $Q_Z$ waveforms are 0.0022 nm$^{-1}$.

[Configuration of Measurement System]

Figure 4:
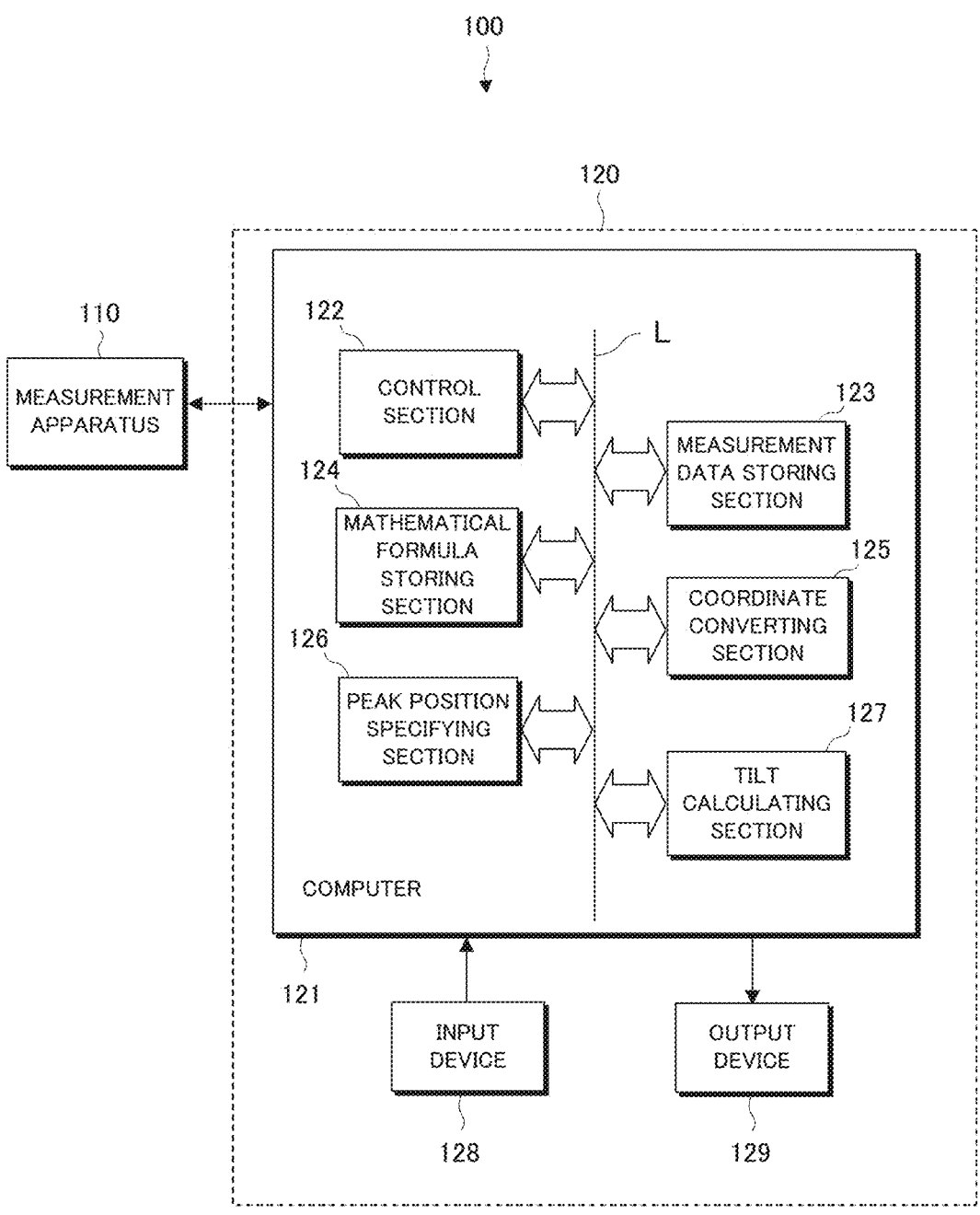
FIG. 4 illustrates a block diagram showing a measurement system of the present disclosure.

Next, the configuration of the measurement system 100 of the present disclosure is described. FIG. 4 is a block diagram showing the measurement system 100. The measurement system 100 comprises a measurement apparatus 110 and an analysis apparatus 120 and irradiates the plate-shaped sample with X-rays to enable measurement and analysis of a transmission CD-SAXS by the measurement of the scattered intensity. The analysis apparatus 120 controls the measurement apparatus 110, manages the measurement data together with the control data, and enables analysis of the data. A specific configuration is described below.

[Configuration of Measurement Apparatus]

Figure 5:
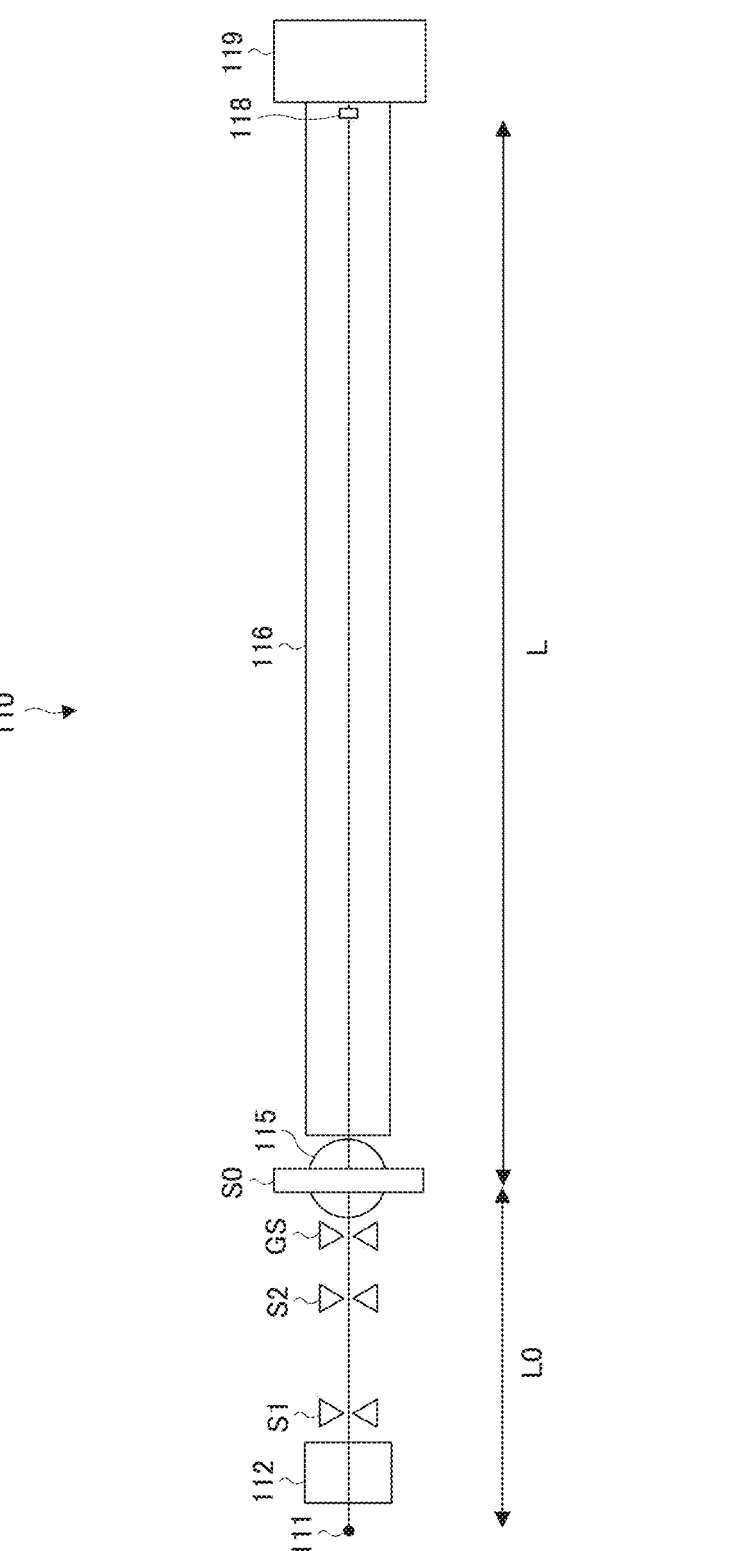
FIG. 5 illustrates a plan view showing a configuration of a measurement apparatus.

FIG. 5 is a plan view showing a configuration of the measurement apparatus 110. The measurement apparatus 110 comprises an X-ray source 111, a mirror 112, a slit S1, S2 and GS, a sample stage 115, a vacuum path 116, a beam stopper 118, and a detector 119. For example, the distance LO from the X-ray source 111 to the sample S0 and the camera length L can be set to 1000 mm and 3000 mm, respectively.

Mok$\alpha$ can be used as the X-ray source 111. The mirror 112 disperses the X-rays emitted from the X-ray source 111 and irradiates the dispersed X-rays toward the sample S0. The slits S1 and S2 are formed of members capable of shielding X-rays and configures slit parts for narrowing the dispersed X-rays. With such a configuration, X-rays can be irradiated at a plurality of rotational angles $\omega$ which are close to the direction perpendicular to the surface of the plate-shaped sample S0. For example, specific angles in the range of −10° to 10° C. an be selected for the plurality of rotation angles w. The slit GS can limit the spot-size of the X-rays on the surface of the sample to a few tens of micrometers or less. Basically, the beam size is determined by the slit S1 and S2, and the parasitic scatterings generated in the slit S1 and S2 are removed by using the slit GS. However, if very small spots are to be generated, the beams can be made smaller with the slit GS.

The sample stage 115 supports the sample S0 on the table, and the orientation of the plate-shaped sample S0 can be adjusted by a driving mechanism under the control of the analysis apparatus 120. Specifically, not only the $\omega$ rotation angle around $Q_Y$ shown in FIG. 1 but also the x rotation angle and the $\varphi$ rotation angle can be adjusted. By such adjusting, it is possible to change the incident angle of the dispersed X-ray into the sample S0 and measure the scattered intensity according to the diffraction angle.

The sample S0 is formed in a plate shape, and the scattering bodies are periodically arranged in directions parallel to the main surface of the sample. An example of the scattering body is a hole. That is, a typical sample is a substrate of a silicon wafer, and in that case the scattering bodies are holes formed by etching. It is important that the higher the integration degree, the more accurate hole shape formation can be confirmed with respect to the specification.

The scattering body is not limited to the above-described hole and may be a pillar. That is, the present disclosure can also be applied to a sample of a silicon substrate in which cylinders are periodically formed on the surface. Alternatively, a sample in which a line pattern (space pattern) such as a long molecular arrangement is formed may be measured.

The vacuum path 116 maintains the path of the scattered beam at vacuum to prevent attenuation of the beam while securing the camera length long. The beam stopper 118 absorbs the direct beam. The detector 119 is, for example, a two-dimensional detector of a semiconductor capable of moving on a circle with a center of the sample position and is capable of detecting the scattering intensity of X-rays. The measurement apparatus 110 and the analysis apparatus 120 are connected to each other, and the detected scattering intensity data is transmitted to the analysis apparatus 120.

In an exemplary embodiment, the measurement apparatus 110 comprises a laser light source and a detector for reflected light. It is possible to adjust the orientation of the plate-shaped sample so that the surface of the plate-shaped sample is perpendicular to the incident direction of the X-rays using the reflection of the laser beam. The orientation adjusted in this way can be used as a reference, where $\omega=\chi=0°$.

[Configuration of Analysis Apparatus]

The analysis apparatus 120 comprises, for example, a PC including memories and processors and can execute respective processes by executing programs. By processing the measurement data acquired from the measurement apparatus 110, it is possible to analyze the fine structure of a plate-shaped sample formed by periodically arranging scattering bodies long in the thickness direction.

The analysis apparatus 120 comprises a computer 121, an input device 128, and an output device 129. Further, the computer 121 comprises a measurement control section 122, a measurement data storing section 123, a mathematical formula storing section 124, a coordinate conversion section 125, a peak position specifying section 126, and a tilt calculating section 127. The computer 121 may be a PC terminal or a server on a cloud. Each section can transmit and receive information via the control bus L.

The measurement control section 122 controls the measurement apparatus 110 and manages control data and measurement data. For example, the measurement control section 122 controls the sample stage 115 by a driving mechanism to adjust the orientation of the sample S0.

The measurement data storing section 123 stores the measured X-ray intensity data. The measured intensity data is measured at an $\omega$ rotation angle in the vicinity of a direction perpendicular to the surface of the plate-shaped sample, and the X-ray incident from the back side of the plate-shaped sample is scattered by the scattering bodies on the front side of the plate-shaped sample and detected by the detector. It is sufficient to have data measured in a single $\omega$ scan. The mathematical formula storing section 124 stores mathematical formulas for fitting to the scattering intensity and coordinate conversion.

The coordinate conversion section 125 converts the coordinate of the scattering vector into the coordinate of the tilt of the scattering body with respect to the waveform based on the intensity of the specific diffraction point on the two-direction components, using the data of the measured scattering intensity.

The coordinate converting section 125 first acquires $Q_Z$ waveforms of the respective diffraction points. Then, a waveform integrated over a plurality of diffraction points can be used as a waveform based on the intensity of a specific diffraction point on the two-direction components. Thus, the peak position can be specified with high accuracy.

The coordinate converting section 125 performs a single analysis or a loop analysis according to the user's selection and the presence or absence of a $Q_Z$ waveform. The details of single and loop analyses are described below. The coordinate converting section 125 selects diffraction points to be subjected to single analysis or loop analysis by user selection or automatically. In a single analysis of $\theta_X$, diffraction points with $Q_Y=0$ nm$^{-1}$ are selected, and in a single analysis of Or, diffraction points with $Q_X=0$ nm$^{-1}$ are selected. In the looped analysis, $Q_X\neq0$ nm$^{-1}$ and $Q_X\neq0$ nm$^{-1}$ diffraction points are selected. In both cases, for example, a diffraction point having a large intensity can be selected. The analysis apparatus 120 can perform both single analysis and loop analysis but may be an apparatus capable of performing only one of them.

If the single analysis has been performed, the coordinate converting section performs coordinate conversion to the coordinate of the tilt of the scattering body on at least one of the two-direction components using the diffraction points where one of the two-direction components in the coordinate of the scattering vector on is 0. As a result, coordinate conversion can be performed in a single time. For example, the two-direction components are components in two directions parallel to the surface of the plate-shaped sample. For example, the two-direction components are components in directions parallel to the surface of the plate-shaped sample and in the x-direction along with the unit cell and the y-direction orthogonal to the x-direction. Thus, the tilt angle of the two components can be easily calculated for the sample in which the orientation of the unit cell is recognized.

If the loop analysis is performed, the coordinate converting section 125, by loop analysis using diffraction points in which none of the two-direction components in the coordinate of the scattering vector are not 0, performs coordinate conversion to the coordinate of the tilt of the scattering body on the two-direction component. As a result, the tilt angle can be calculated with high accuracy using many diffraction points.

The peak position specifying section 126 specifies the peak position with respect to $Q_Z$ waveform which is the waveform of the intensity with respect to the coordinate of the tilt after the coordinate conversion.

The peak position specifying section 126 acquires a mathematical formula for fitting from the mathematical formula storing section 124 and calculates a peak position of $Q_Z$ waveform by fitting. The peak position specifying section 126 checks whether or not the fitting performed is optimal and changes the parameters until the fitting is optimal. $\theta_X$ and $\theta_Y$ at the peak of the resulting waveform converge to the X component $T_X$ and Y component $T_Y$ of the tilt of the scattering body, respectively.

The tilt calculating section 127 calculates, as the tilt of the scattering bodies on two-direction components, a difference between the specified peak position and the peak position obtained by assuming that the scattering bodies are not tilted from a direction perpendicular to the surface of the plate-shaped sample. As a result, the measurement and analysis time can be shortened, and the tilt angle on the two-direction components can be calculated with high analysis accuracy.

The input device 128 is, for example, a keyboard or a mouse and receives an input to the computer 121. The user can select the type of analysis and the diffraction point via the input device 128. The output device 129 is, for example, a display and outputs a screen for selection and an analysis result.

[Measurement and Analysis Methods]

(Overall Flow)

Figure 6:
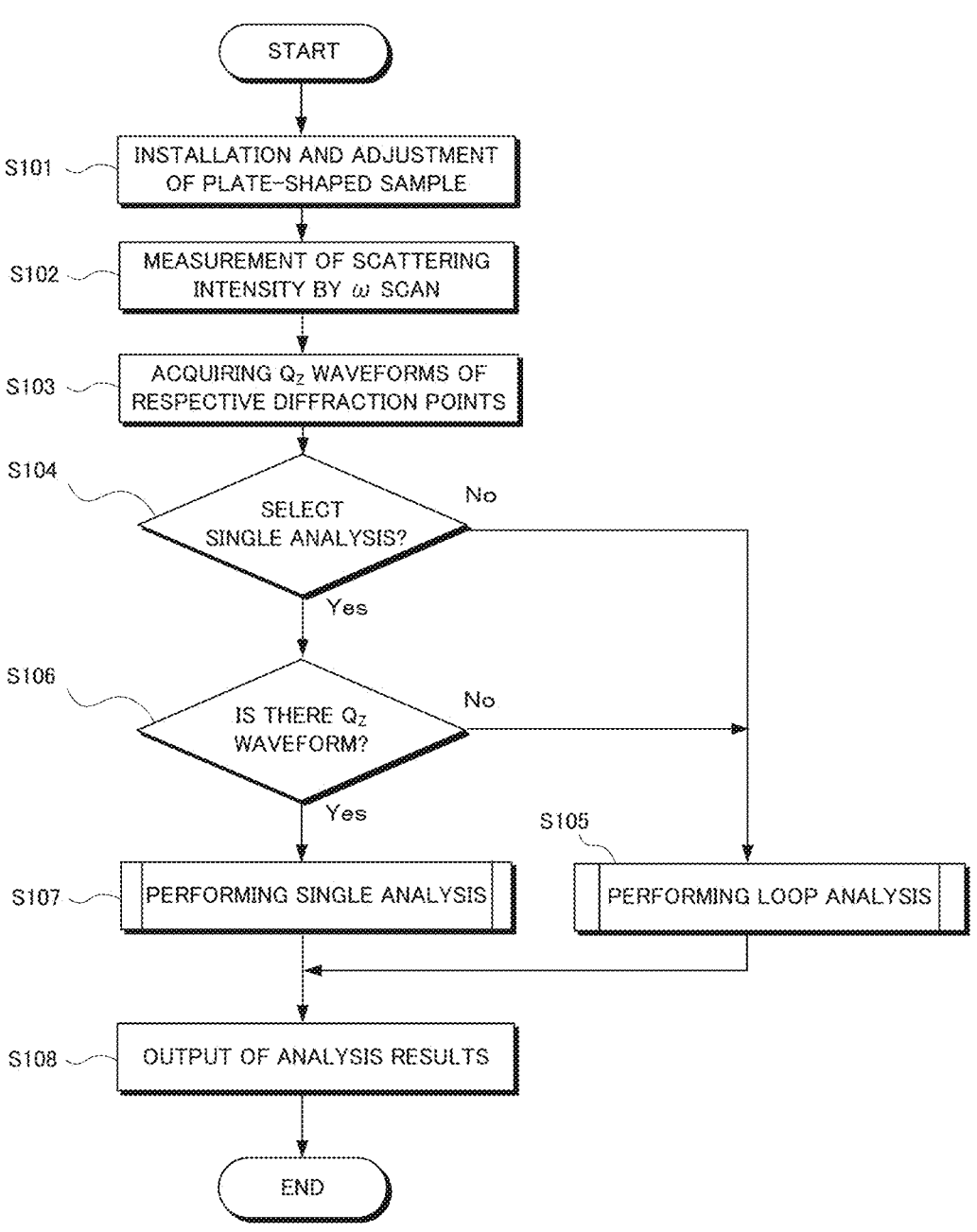
FIG. 6 illustrates a flowchart showing a measurement and analysis procedure of the present disclosure.

Next, a measurement and analysis method using the configuration of the above-described system is described. FIG. 6 is a flowchart showing a measurement and analysis procedure. As shown in FIG. 6, first, a plate-shaped sample is placed, and the position is adjusted (step S101). Then, the scattered intensity is measured by one ω-scan (step S102). So far is the measurement.

In the analysis, first, $Q_Z$ waveforms of the respective diffraction points are acquired on the basis of the measured data (step S103). Then, a selection of the user is accepted, and it is determined whether or not a single analysis for independently analyzing $Q_X$ and $Q_Y$ is selected (step S104). If a single analysis is not selected (=if a loop analysis is selected), a loop analysis is performed (step S105) and the process proceeds to step S108.

If a single analysis is selected, it is determined whether a $Q_Z$ waveform exists with both $Q_X=0$ nm$^{-1}$ and $Q_Y=0$ nm$^{-1}$. If it does not exist, the process proceeds to step S105. If it exists, a single analysis is performed (step S107). Then, the analysis result is output (step S108), and the series of steps is ended.

Figure 7A:
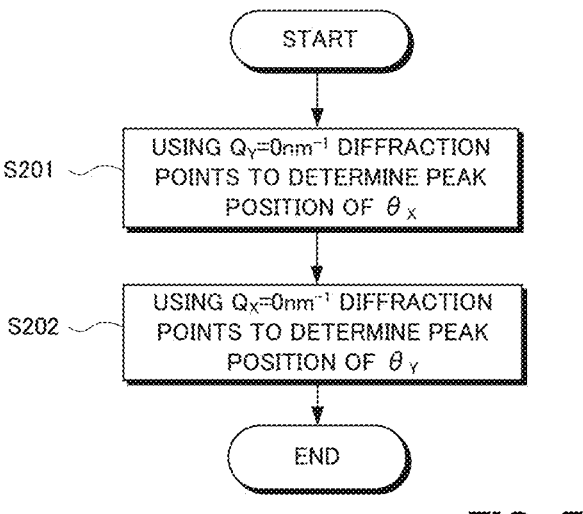
FIGS. 7A and 7B illustrate flow charts showing single and looped analyses, respectively.
Figure 7B:
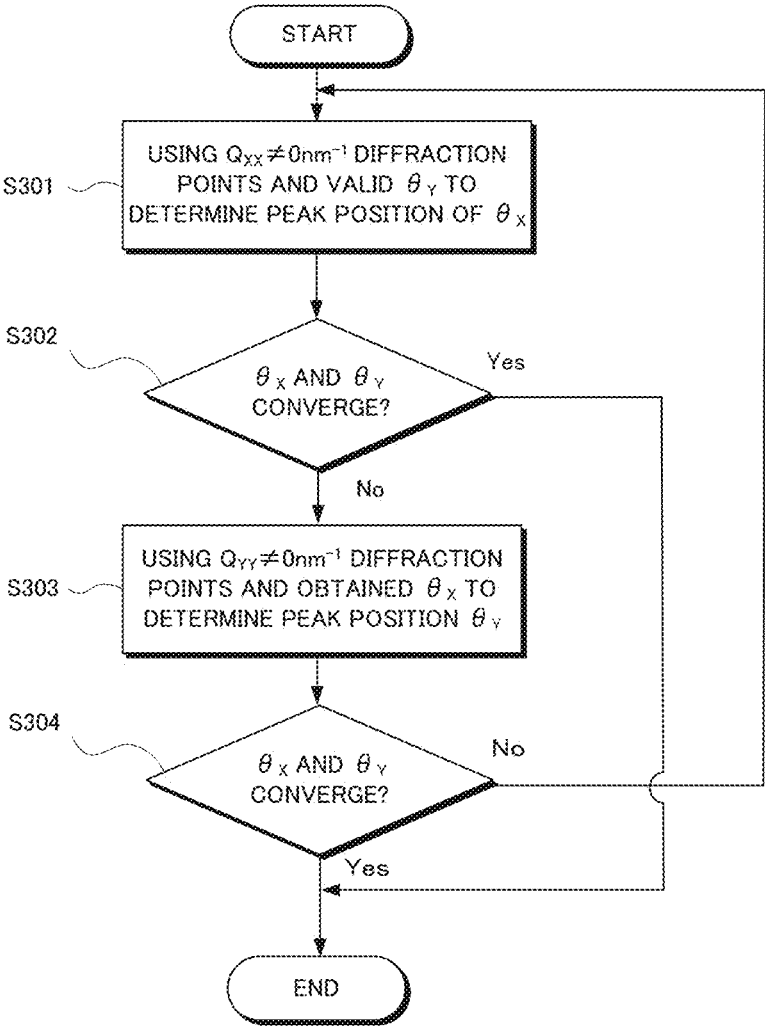

FIGS. 7A and 7B are flow charts showing single and looped analyses, respectively.

As shown in FIG. 7A, in the single analysis, diffractive points with $Q_Y=0$ nm$^{-1}$ are used to determine the peak position of $\theta_X$ as the X component of the tilt angle (step S201). Then, the peak position of $\theta_Y$ is determined as the Y component of the tilt angle by using the diffraction points with $Q_X=0$ nm$^{-1}$ (step S202), and the single analysis is ended.

Further, as shown in FIG. 7B, in the loop-analysis, the peak position of $\theta_X$ is determined by using a valid $\theta_Y$ and the diffraction points with $Q_X\neq0$ nm$^{-1}$ (step S301). Then, it is determined whether or not $\theta_X$ and $\theta_Y$ have converged (step S302). The convergence determination can be performed, for example, as to whether or not the difference or the variation of $\theta_X$ and $\theta_Y$ are equal to or less than a threshold.

If they have converged, the loop analysis is ended. If they have not converged, the process proceeds to step S303.

Next, the peak position of $\theta_Y$ is determined using the determined $\theta_X$ and the diffraction points with $Q_Y\neq0$ nm$^{-1}$ (step S303). Then, it is determined whether or not $\theta_X$ and $\theta_Y$ have converged (step S304). If they have converged, the loop analysis is ended. If they have not converged, the process proceeds to step S301. Thus, $\theta_X$ and $\theta_Y$ which finally converged are the X component and the Y component of the tilt angle, respectively. In any of the above analyses, there is an order in the analysis of $\theta_X$ and $\theta_Y$, but the order may be reversed. Further, each process in the above analysis can be performed by executing a program.

(Single Analysis)

The details of the single analysis are described by way of example. The single analysis is an analysis method in which a tilt angle can be specified by using a mathematical formula in a single time when a $Q_Z$ waveform is present with both $Q_X=0$ nm$^{-1}$ and $Q_Y=0$ nm$^{-1}$. Here, $\theta_X$ and $\theta_Y$ can be calculated independently.

Figure 8:
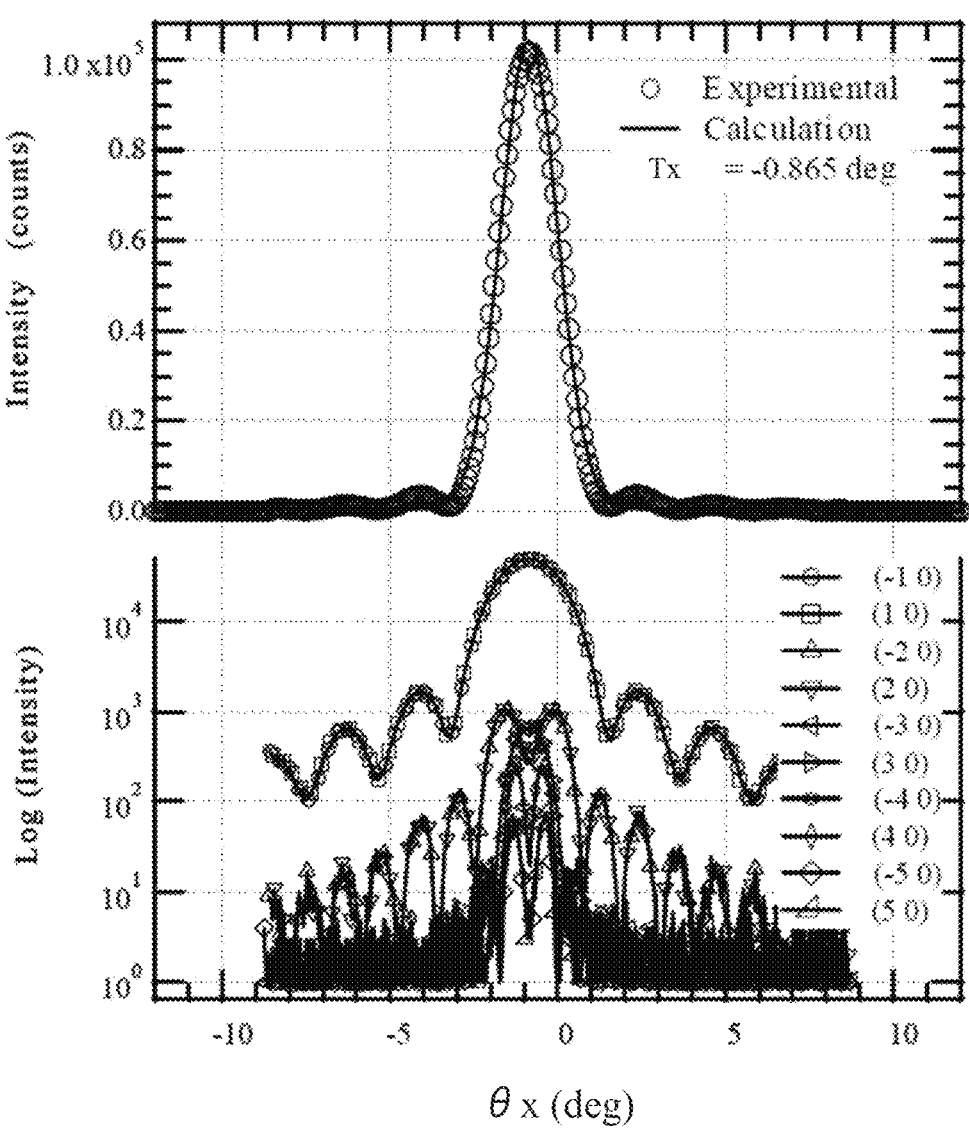
FIG. 8 illustrates a graph showing $Q_Z$ waveforms based on the intensity for $\theta_X$ of diffractive points with $Q_Y=0$ $nm^{-1}$.

In the single analysis, the horizontal axis of $Q_Z$ waveform is first applied a coordinate conversion into the $\theta_X$ using only the diffractive points with $Q_Y=0$ nm$^{-1}$ using the following formula. FIG. 8 is a graph showing $Q_Z$ waveforms based on the intensity for $\theta_X$ of diffractive points with $Q_Y=0$ nm$^{-1}$.

$$\theta_X = -\tan^{-1}\left(\frac{Q_Z}{Q_X}\right) \tag{8}$$

The intensities are integrated on the horizontal axis $\theta_x$ with respect to the plurality of waveforms shown on the lower side of FIG. 8, and the peak position on the X component of the tilt angle is determined by peak search with respect to the waveform indicating the integration on the upper side of FIG. 8.

Figure 9:
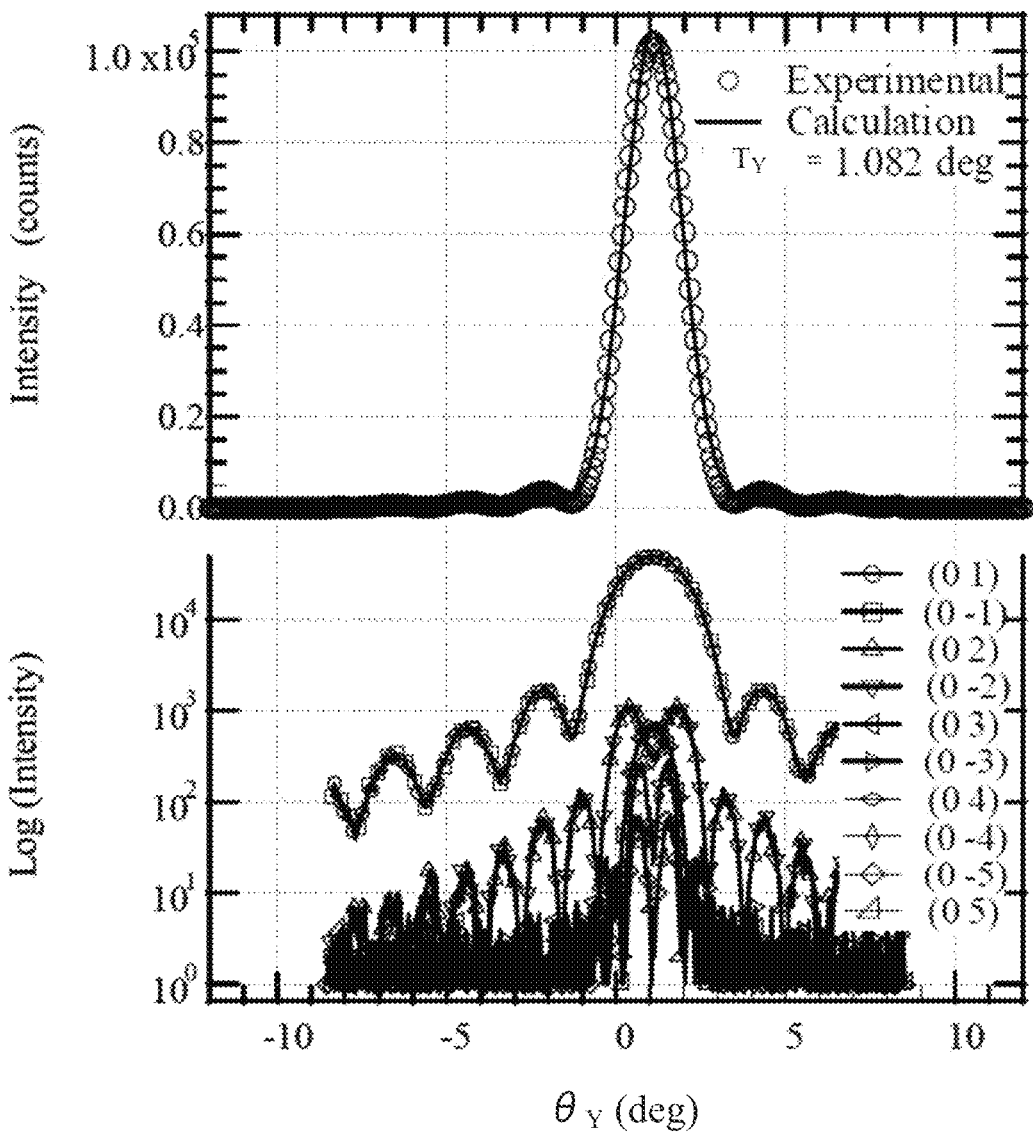
FIG. 9 illustrates a graph showing $Q_Z$ waveforms based on the intensity for $\theta_Y$ of diffractive points with $Q_X=0$ $nm^{-1}$.

On the other hand, for $Q_Z$ waveform, only the diffractive points with $Q_X=0$ nm$^{-1}$ are used, and the horizontal axis of $Q_Z$ waveform is applied a coordinate conversion into $\theta_Y$ using the following formula. FIG. 9 is a graph showing waveforms based on the intensity for $\theta_Y$ of diffractive points with $Q_X=0$ nm$^{-1}$.

$$\theta_Y = -\tan^{-1}\left(\frac{Q_Z}{Q_Y}\right) \tag{9}$$

The Intensities are integrated on the horizontal axis $\theta_Y$ with respect to a plurality of waveforms shown in the lower side of FIG. 9, and a peak position as a Y-component of the tilt angle is determined by peak search with respect to the waveform showing the integration on the upper side of FIG. 9.

In such a single analysis, $Q_X$ is not correlated with $Q_Y$, and $\theta_X$ and $\theta_Y$ can be independently calculated. On the other hand, diffraction points respectively with $Q_X=0$ nm$^{-1}$ and $Q_Y=0$ nm$^{-1}$ needs to be prepared as diffraction points for use in analysis.

(Loop Analysis)

The loop analysis is an analysis that can specify the tilt angle by repeatedly calculating $\theta_X$ and $\theta_Y$ and converging the numerical value when there is no $Q_Z$ waveform with $Q_X=0$ nm$^{-1}$ or $Q_Y=0$ nm$^{-1}$. The loop analysis is described by way of example.

Figure 10:
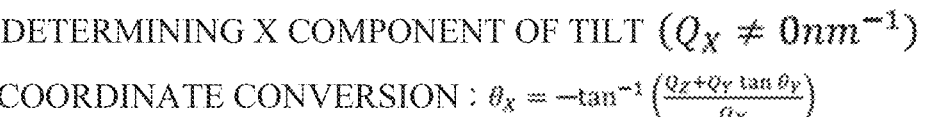
FIG. 10 illustrates a graph showing $Q_Z$ waveforms based on the intensity for $\theta_X$ of diffraction points with $Q_X \neq 0$ $nm^{-1}$.
Figure 10:
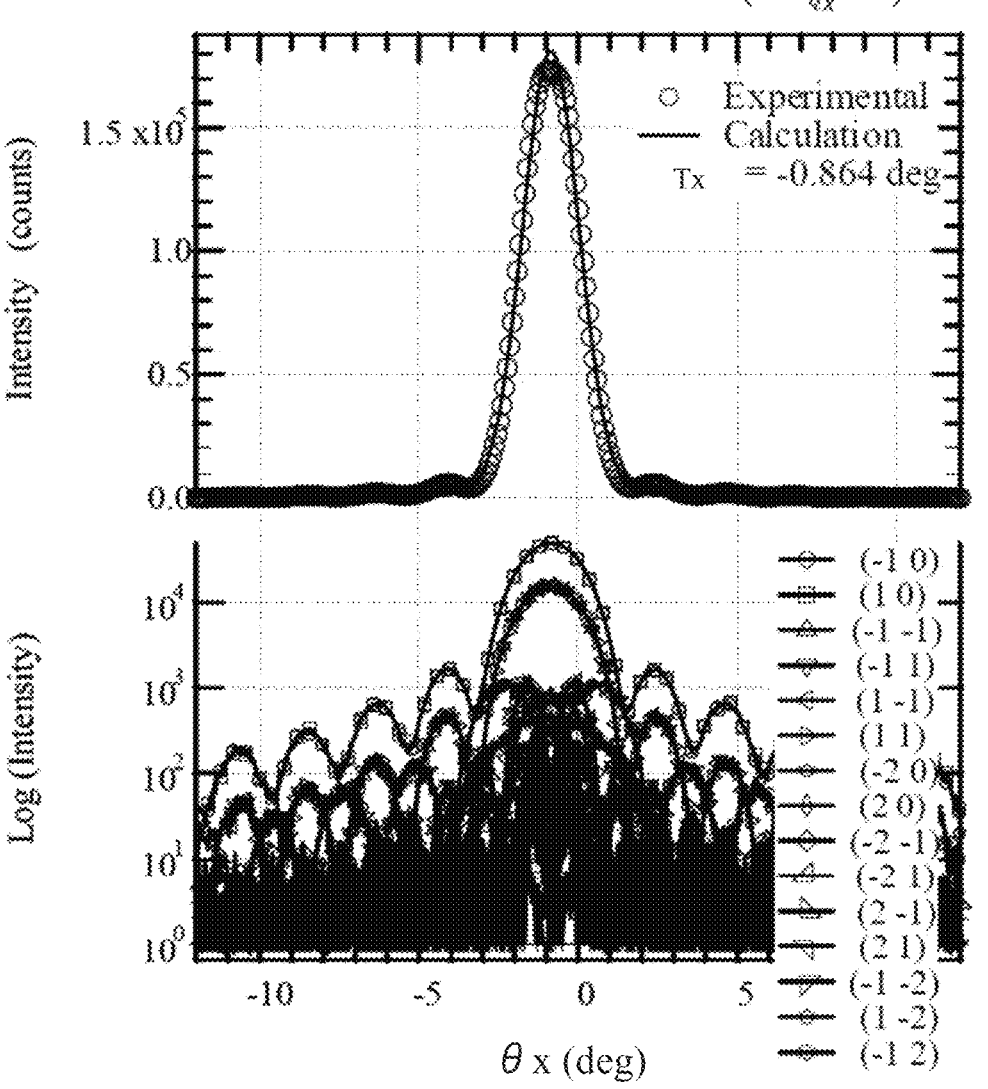

First, $\theta_Y$ is given a valid value as the initial value. For example, $\theta_Y=0$. Further, using diffractive points with $Q_X\neq0$ $nm^{-1}$, the horizontal axis of $Q_Z$ waveform is converted into $\theta_X$ by formula (5). FIG. 10 is a graph showing $Q_Z$ waveforms based on the intensity for $\theta_X$ of diffraction points with $Q_X \neq 0$ $nm^{-1}$. The intensities are integrated on the horizontal axis $\theta_X$ with respect to a plurality of waveforms shown on the lower side of FIG. 10, and the peak position of $\theta_X$ is determined by peak searching with respect to the waveform showing the integration on the upper side of FIG. 10.

Figure 11:
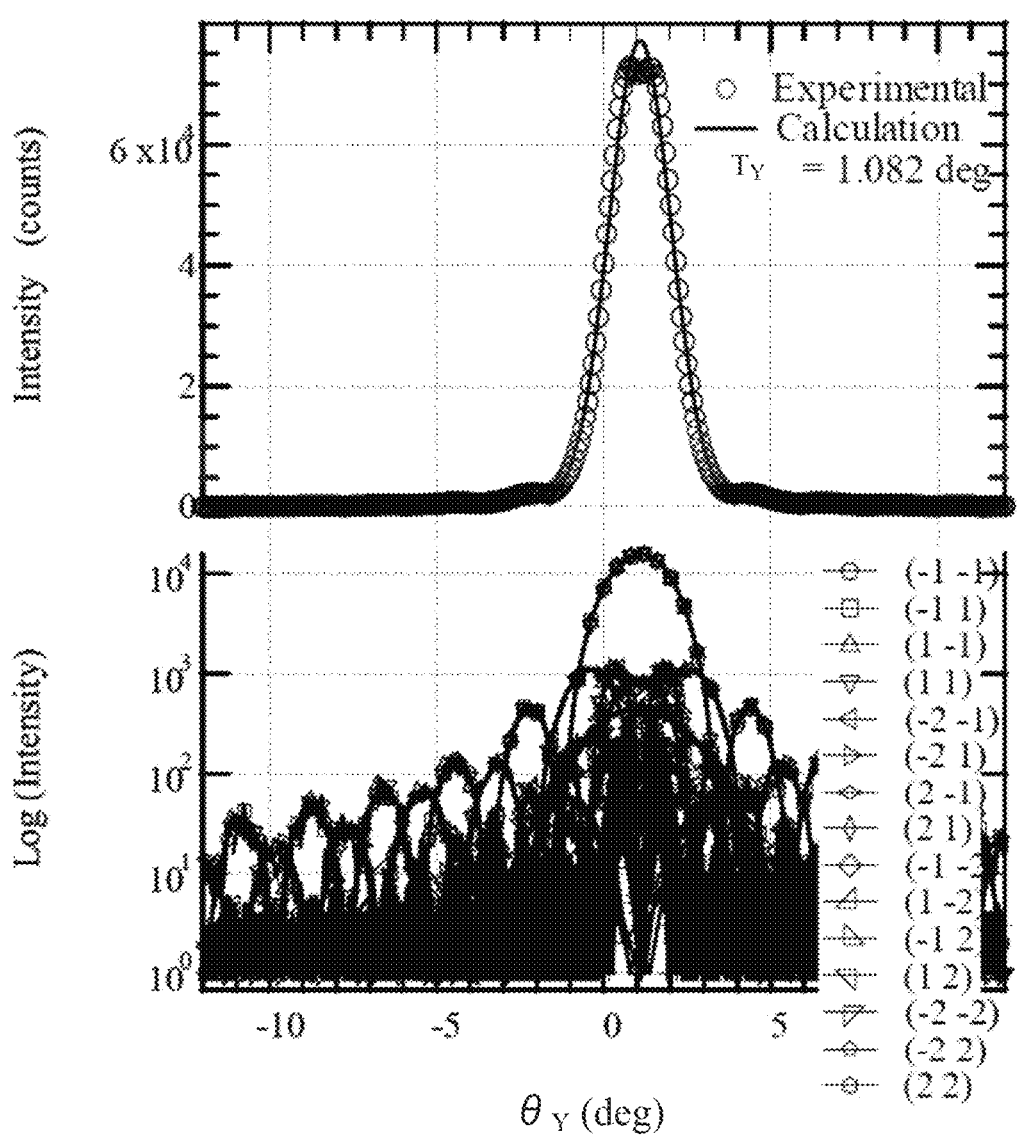
FIG. 11 illustrates a graph showing $Q_Z$ waveforms based on the intensity for $\theta_Y$ of diffraction points with $Q_Y \neq 0$ $nm^{-1}$.

A numerical value of the determined peak-position is then given to $\theta_X$. Further, using diffractive points with $Q_Y \neq 0$ $nm^{-1}$, the horizontal axis of $Q_Z$ waveform is converted into $\theta_Y$ by formula (6). FIG. 11 is a graph showing $Q_Z$ waveforms based on the intensity for $\theta_Y$ of diffraction points with $Q_Y \neq 0$ $nm^{-1}$. The Intensities are integrated on the horizontal axis $\theta_Y$ with respect to a plurality of waveforms shown on the lower side of FIG. 11, and the peak position of $\theta_Y$ is determined by peak search with respect to the waveform showing the integration on the upper side of FIG. 11. The determination of the peak position of $\theta_X$ and $\theta_Y$ is repeated until the peak position of $\theta_X$ and $\theta_Y$ converges.

$Q_Z$ waveform with $Q_Y=0$ $nm^{-1}$ or $Q_X=0$ $nm^{-1}$ may not be present if the measurement is performed under the condition that the rotational axis is same as $Q_X$ or $Q_Y$ direction. In such a case, the X component and the Y component of the tilt angle cannot be determined independently, but the X component and the Y component of the tilt angle can be determined using the loop analysis. The loop analysis can also be used at diffraction points with $Q_X=0$ $nm^{-1}$ or $Q_Y=0$ $nm^{-1}$, and many diffraction points can be used for the analysis.

Figures 12A, 12B:
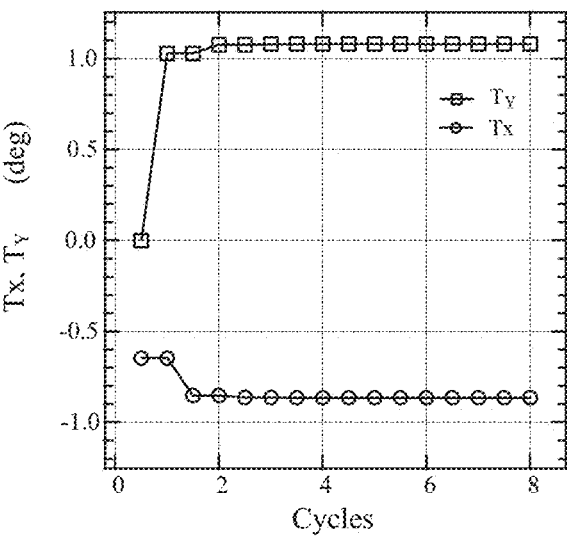
FIGS. 12A and 12B illustrate a graph and a table showing optimize of XY components of the tilt, respectively.

FIGS. 12A and 12B are a graph and a table showing optimize of XY components of the tilt, respectively. The respective peak positions of $\theta_X$ and $\theta_Y$ are expressed as $T_X$ and $T_Y$. In the examples shown in FIGS. 12A and 12B, the numerical values converge by about four cycles of the loop analysis.

Example 1

Examples are described below. First, as an application to the case where there is a $Q_Z$ waveform with both $Q_X=0$ $nm^{-1}$ and $Q_Y=0$ $nm^{-1}$, the measurement was performed by rotating the silicon wafer sample 45° about an axis perpendicular to the wafer surface with respect to the notch and aligning an orientation of 45° with respect to the X-Y plane with the axis of $\omega$ rotation, and performing the $\omega$ rotation. Then, the tilt angle was calculated based on the obtained measurement data.

Figure 13A:
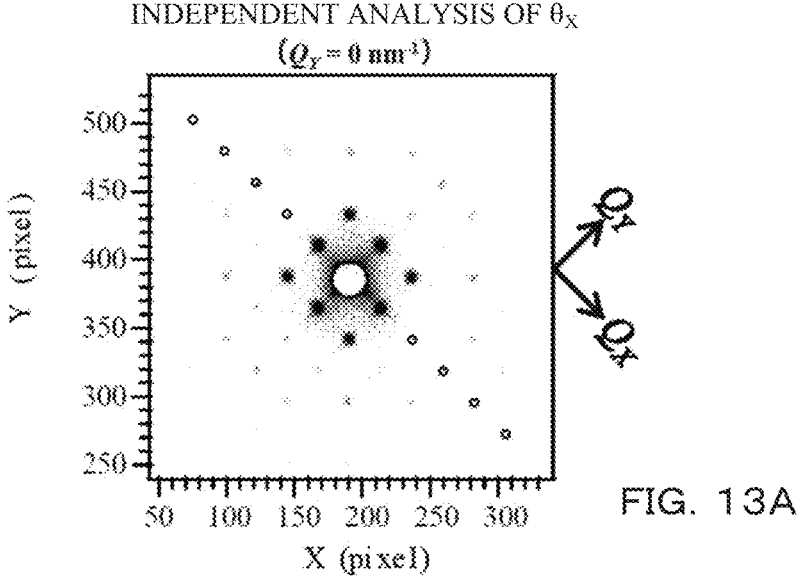
FIGS. 13A and 13B illustrate a diffraction image subject to a single analysis of $\theta_X$ and a graph showing $Q_Z$ waveforms based on the intensity for $\theta_X$ of diffraction points with $Q_Y=0$ $nm^{-1}$, respectively.
Figure 13B:
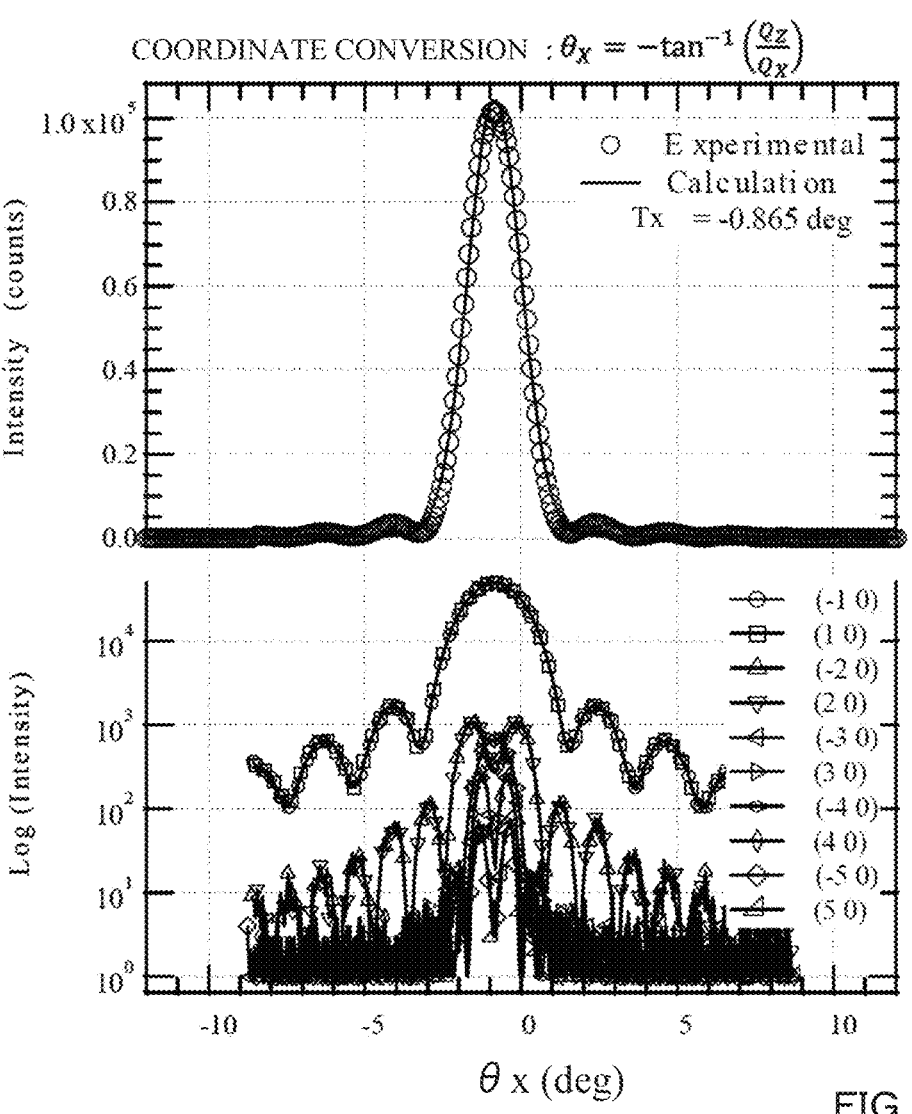
Figure 14A:
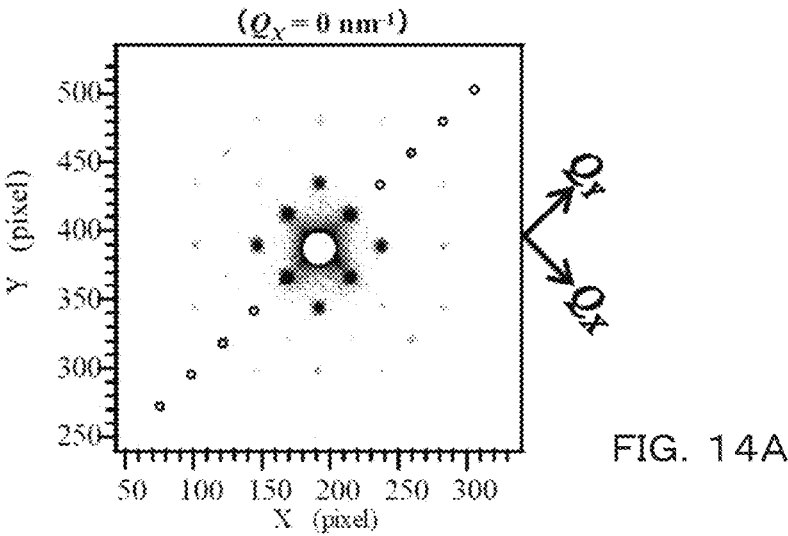
FIGS. 14A and 14B illustrate a diffraction image subject to a single analysis of $\theta_Y$ and a graph showing $Q_Z$ waveforms based on the intensity for $\theta_Y$ of diffraction points with $Q_X=0$ $nm^{-1}$, respectively.
Figure 14B:
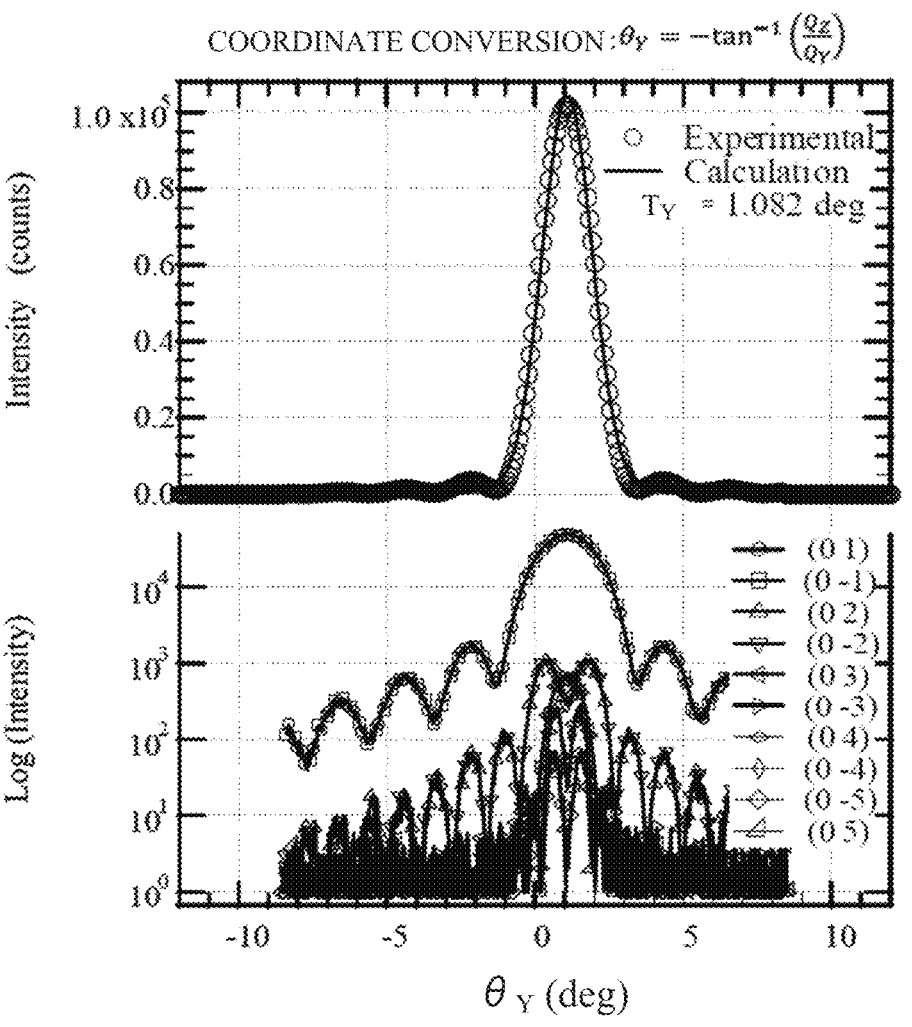

FIGS. 13A and 13B are a diffraction image subject to a single analysis of $\theta_X$ and a graph showing $Q_Z$ waveforms based on the intensity for $\theta_X$ of diffraction points with $Q_Y=0$ $nm^{-1}$, respectively. FIGS. 14A and 14B are a diffraction image subject to a single analysis of $\theta_Y$ and a graph showing $Q_Z$ waveforms based on the intensity for $\theta_Y$ of diffraction points with $Q_X=0$ $nm^{-1}$, respectively.

Figure 15A:
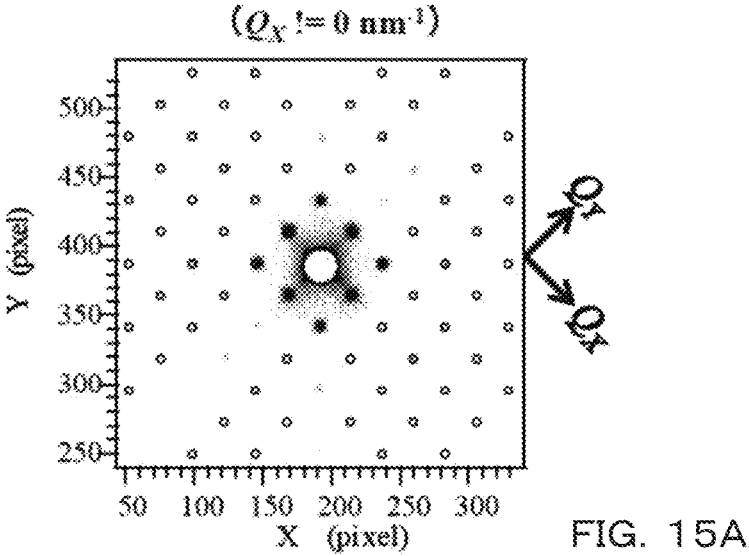
FIGS. 15A and 15B illustrate a diffraction image subject to a loop analysis and a graph showing $Q_Z$ waveforms based on the intensity for $\theta_X$ of diffraction points, respectively.
Figure 15B:
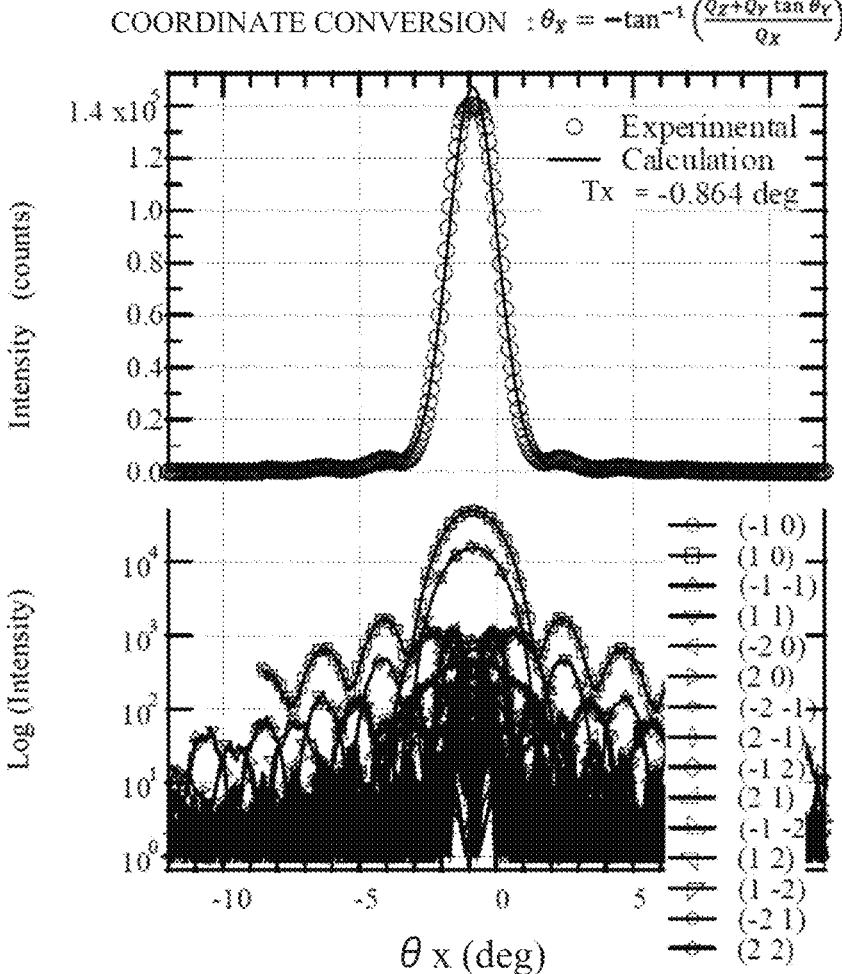
Figure 16A:
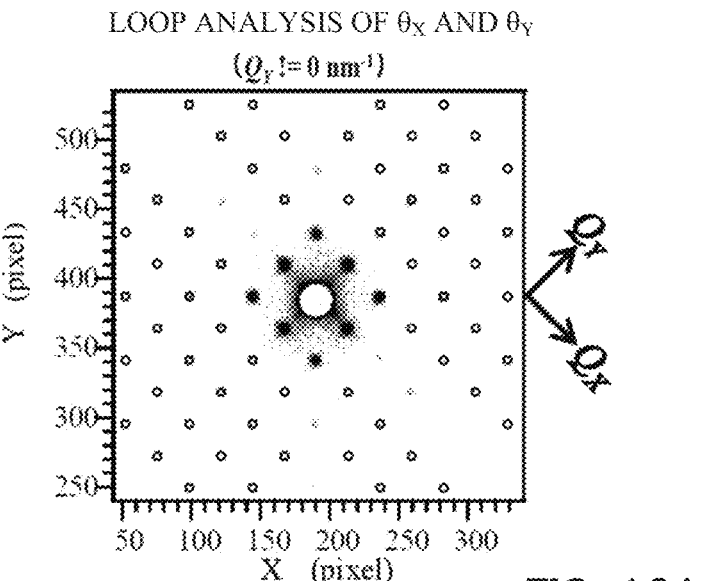
FIGS. 16A and 16B illustrate a diffraction image subject to a loop analysis and a graph showing $Q_Z$ waveforms based on the intensity for $\theta_Y$ of diffraction points, respectively.
Figure 16B:
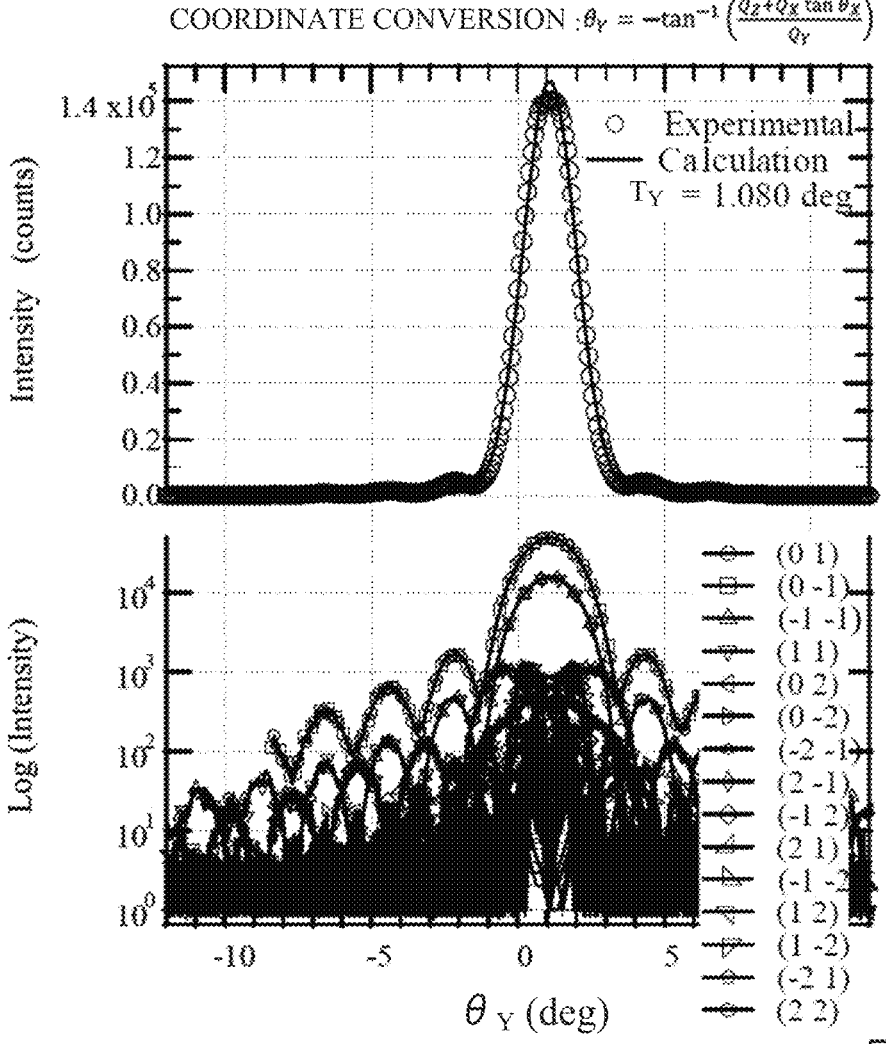

FIGS. 15A and 15B are a diffraction image subject to a loop analysis and a graph showing $Q_Z$ waveforms based on the intensity for $\theta_X$ of diffraction points, respectively. FIGS. 16A and 16B are a diffraction image subject to a loop analysis and a graph showing $Q_Z$ waveforms based on the intensity for $\theta_Y$ of diffraction points, respectively.

In the loop analysis, the numerical values converged by 4 cycles. FIG. 15B and FIG. 16B show $Q_Z$ waveforms at 3.5th and 4th cycle, respectively. These are $Q_Z$ waveforms at convergence. In the single analysis, −0.865 deg and 1.082 deg were obtained as the X component $T_X$ of the tilt angle and the Y component $T_Y$ of the tilt angle, respectively. In the loop analysis, −0.864 deg and 1.080 deg were obtained as the X component $T_X$ of the tilt angle and the Y component $T_Y$ of the tilt angle, respectively. Thus, analysis results coincided with each other with high accuracy.

Example 2

Next, as an application example when there is no $Q_Z$ waveform with either $Q_X=0$ $nm^{-1}$ or $Q_Y=0$ $nm^{-1}$, the silicon wafer sample was measured by rotating $\omega$ around the Y-axis (parallel to $Q_Y$ axis) of the sample used in Example 1. Then, the tilt angle was calculated based on the acquired measurement data.

Figure 17A:
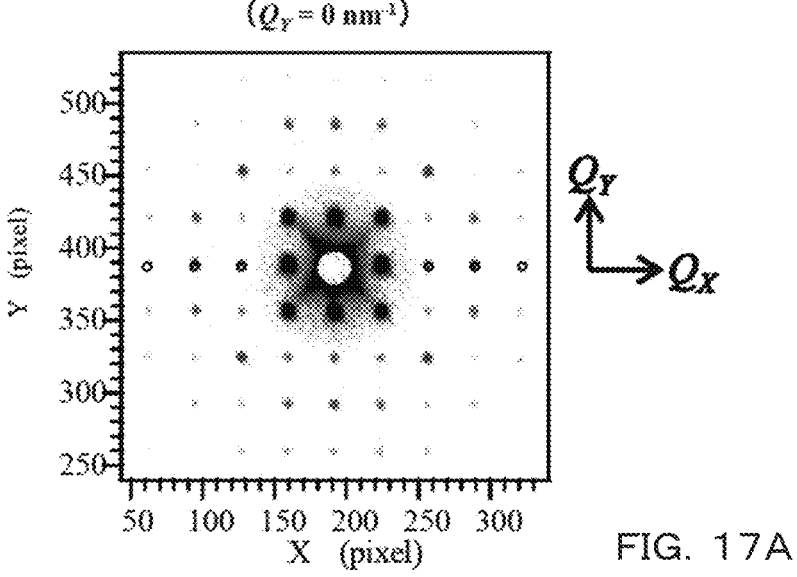
FIGS. 17A and 17B illustrate a diffraction image subject to a single analysis of $\theta_X$ and a graph showing $Q_Z$ waveforms based on the intensity for $\theta_X$ of diffraction points with $Q_Y=0$ $nm^{-1}$, respectively.
Figure 17B:
Figure 17B:
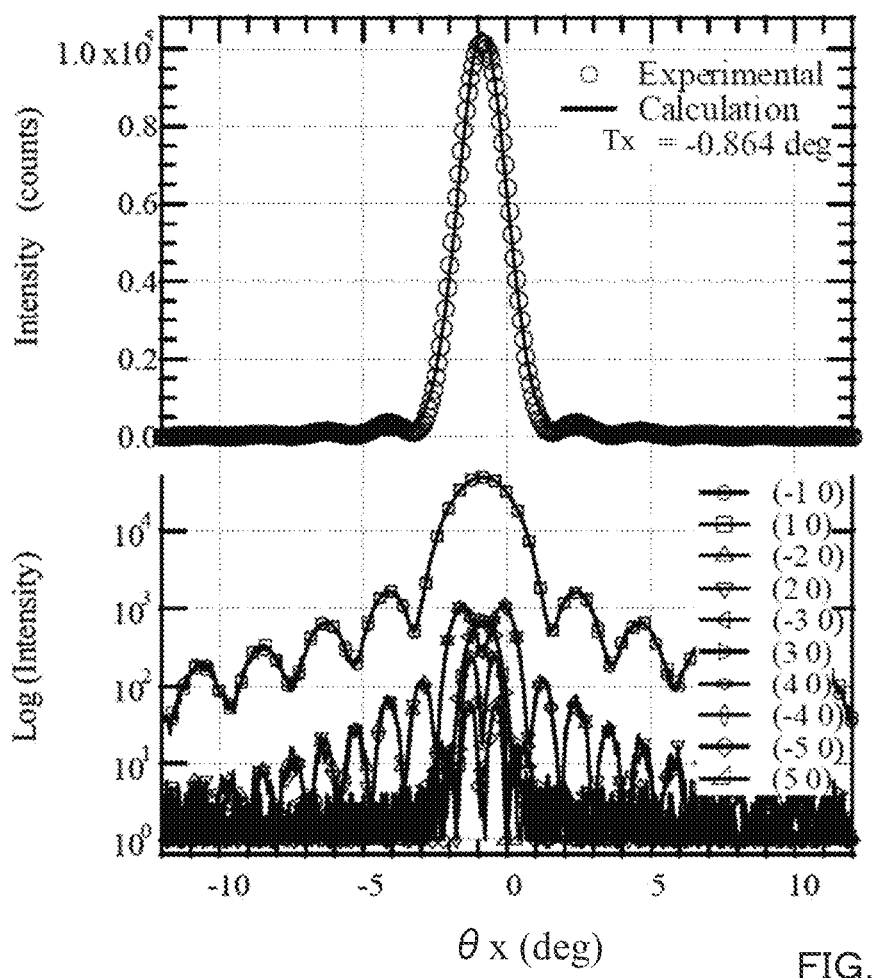
Figure 18:
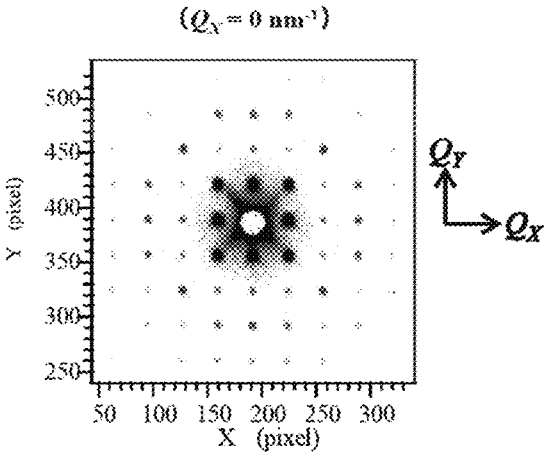
FIG. 18 illustrates a diffracted image subject to a single analysis of $\theta_Y$.

FIGS. 17A and 17B are a diffraction image subject to a single analysis of $\theta_X$ and a graph showing $Q_Z$ waveforms based on the intensity for $\theta_X$ of diffraction points with $Q_Y=0$ $nm^{-1}$, respectively. FIG. 18 is a diffracted image subject to a single analysis of $\theta_Y$. Since the rotational axis coincides with $Q_Y$ direction, $Q_Z$ dependency of the diffracted point with $Q_X=0$ $nm^{-1}$ could not be obtained. Therefore, a single analysis of $\theta_Y$ was not possible.

Figure 19A:
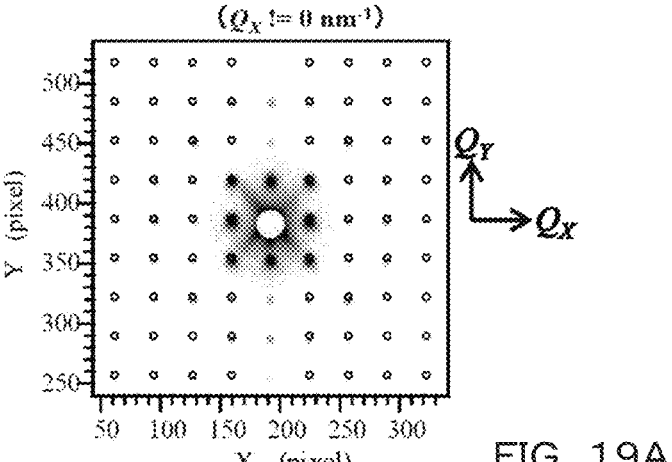
FIGS. 19A and 19B illustrate a diffraction image subject to a loop analysis and a graph showing $Q_Z$ waveforms based on the intensity for $\theta_X$ of diffraction points, respectively.
Figure 19B:
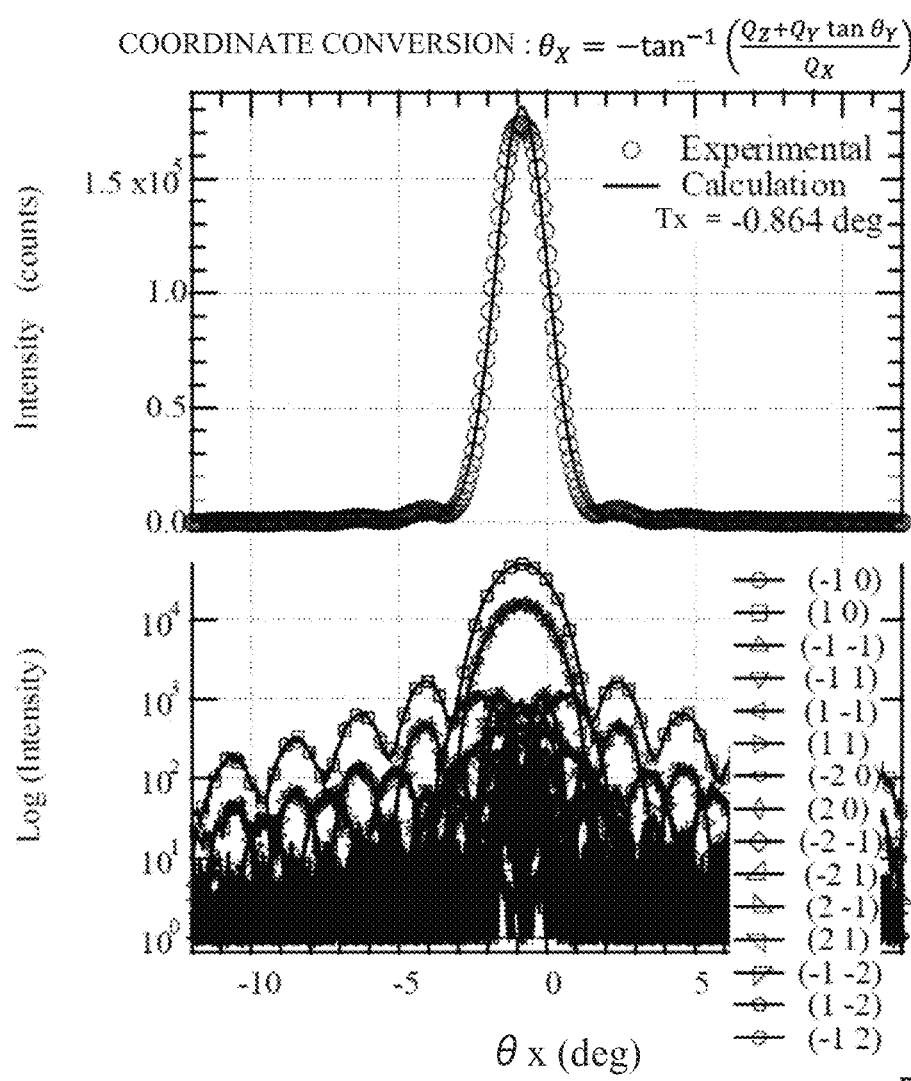
Figure 20A:
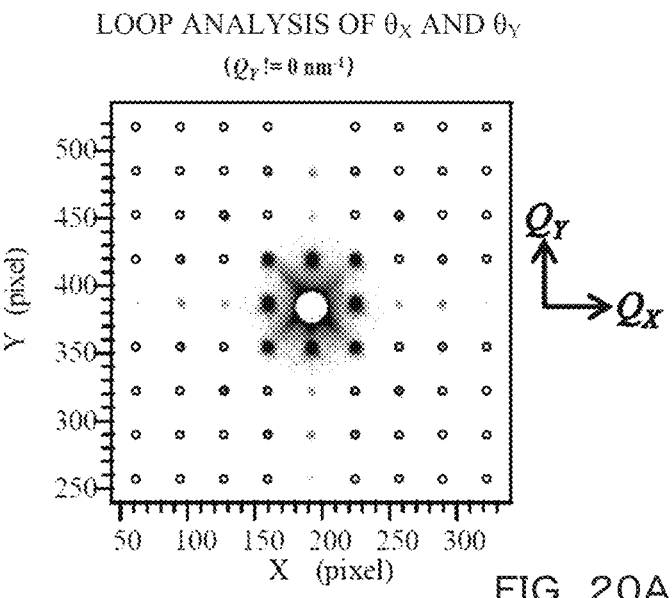
FIGS. 20A and 20B illustrate a diffraction image subject to a loop analysis and a graph showing $Q_Z$ waveforms based on the intensity for $\theta_Y$ of diffraction points, respectively.
Figure 20B:
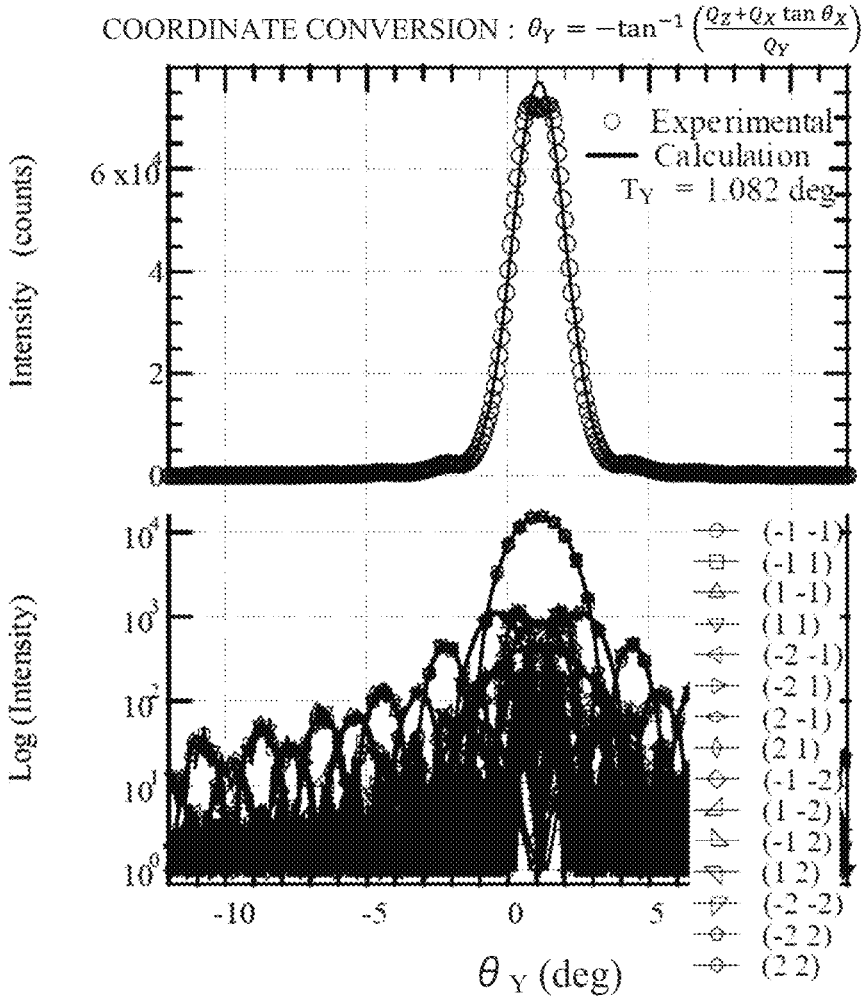

FIGS. 19A and 19B are a diffraction image subject to a loop analysis and a graph showing $Q_Z$ waveforms based on the intensity for $\theta_X$ of diffraction points, respectively. FIGS. 20A and 20B are a diffraction image subject to a loop analysis and a graph showing $Q_Z$ waveforms based on the intensity for $\theta_Y$ of diffraction points, respectively.

In the loop analysis, the numerical values converged by 4 cycles. FIG. 19B and FIG. 20B show $Q_Z$ waveforms at 3.5th and 4th cycle, respectively. These are $Q_Z$ waveforms at convergence. In the single analysis, −0.864 deg was obtained as the X-component $T_X$ of the tilt angle. In the loop analysis, −0.864 deg and 1.082 deg were obtained as the X component $T_X$ of the tilt angle and the Y component $T_Y$ of the tilt angle, respectively. Thus, the X-components $T_X$ of the tilt angle coincided with each other with high accuracy.

Second Embodiment

The two-direction components need not necessarily be the X component and the Y component. As the two-direction components, parallel to the surface of the plate-shaped sample, a component in $a_0$ direction which is and is the scanning direction of $\omega$-scanning and a component in $a_1$ direction orthogonal to $a_0$ direction can also be used. In this case, even when the orientation of the sample is not known, the tilt angle on the two components can be calculated based on the scan direction.

(Single Analysis)

In this embodiment, a single analysis is possible. First, $a_0$ is independently determined by the following formula (10) using only the diffractive points of the scanning direction ($\theta_{hk}=0$, $\theta_{hk}=\pi$) with tan $\theta_{hk}$ of 0. Note that $\omega0$ is the rotational angle of the sample corresponding to $Q_Z=0$ $nm^{-1}$, and $\theta_{hk}$ is the deflection angle of the diffracted point of the index (hk).

$$a_0 = \omega - \omega_0 - a_1 \tan \theta_{hk} \qquad (10)$$

Next, $a_1$ is determined using formula (11).

$$a_1 = \frac{\omega - \omega_0 - a_0}{\tan \theta_{hk}} \qquad (11)$$

Here, when the diffraction points in the scanning direction ($\theta_{hk}$=0, $\theta_{hk}$=$\pi$) and the diffraction point in the direction perpendicular to the scanning direction ($\theta_{hk}$=$\pm\pi/2$) are selected, tan $\theta_{hk}$ is 0 or diverges to infinity. Therefore, diffraction points other than the diffraction points in the scanning direction and the diffraction point in the direction orthogonal to the scanning direction are selected. The selected diffraction points are then used to determine $a_1$ using $a_0$ determined above. In this way, $a_0$ and $a_1$ can be determined as the components of the scanning direction for the tilt of the scattering body and the direction perpendicular to the scanning direction in a single time without looping.

Then, using formula (12) below, with regard to the peak positions of the converged $a_0$ and $a_1$, the components in $a_0$ and $a_1$ directions of the tilt angle are converted into the direction $\beta$ determined by the notch on the silicon wafer sample.

$$\theta_X = -a_0 \cos\beta - a_1 \sin\beta \qquad (12)$$

$$\theta_Y = a_0 \sin\beta - a_1 \cos\beta$$

(Loop Analysis)

The following loop analysis is also possible. All diffraction points except the diffraction points ($\theta_{hk}$=$\pm\pi/2$) in the direction perpendicular to the scanning direction are used, an appropriate value (for example, 0) is given to $a_1$ as an initial value, and the peak position of $a_0$ is determined from $Q_Z$ waveform performed the coordinate conversion by formula (10) using all diffraction points.

Further, based on $Q_Z$ waveform performed the coordinate conversion by formula (11), all diffraction points except the diffraction points in the scanning direction ($\theta_{hk}$=0, $\theta_{hk}$=$\pi$) and the diffraction points in the direction perpendicular to the scanning direction ($\theta_{hk}$=$\pm\pi/2$) are used to determine the peak position of $a_1$ using $a_0$ determined above.

The calculation is repeated to determine the peak positions of $a_0$ and $a_1$ until the peak positions of $a_0$ and $a_1$ converge. Once the values converge, formula (12) is used to convert the components on $a_0$ and $a_1$ directions of the tilt angle into the components on a direction $\beta$ that is determined by the notch on the silicon wafer sample with regard to the peak position of the converged $a_0$ and $a_1$.

Example 3

Figure 21:
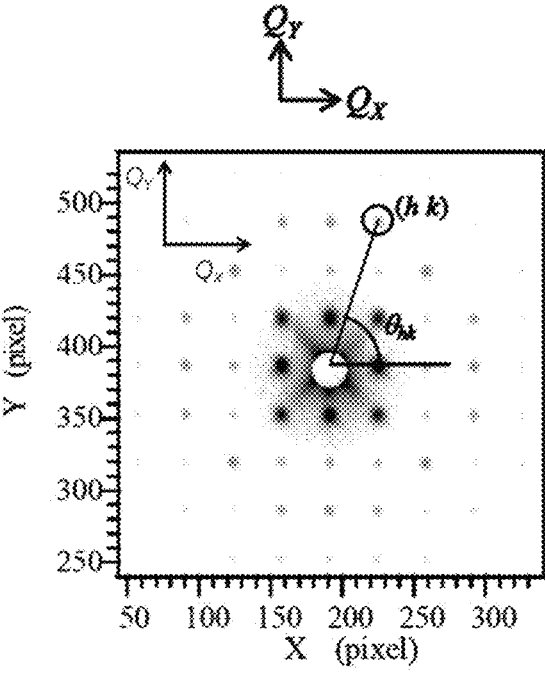
FIG. 21 illustrates a diffraction image subject to a single analysis.
Figure 22:
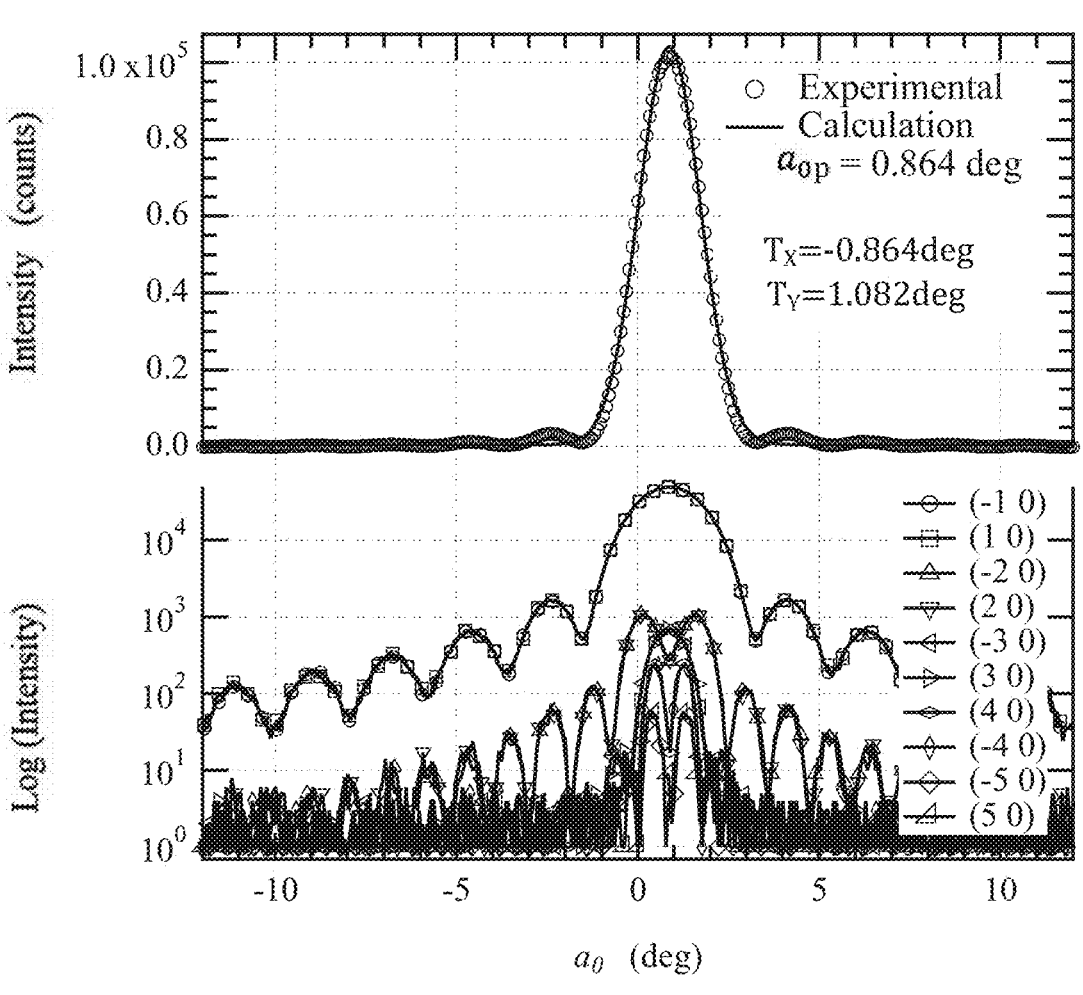
FIG. 22 illustrates a diffraction image subject to a single analysis and a graph showing $Q_Z$ waveforms based on the intensity for $a_0$ of diffraction points, respectively.
Figure 23:
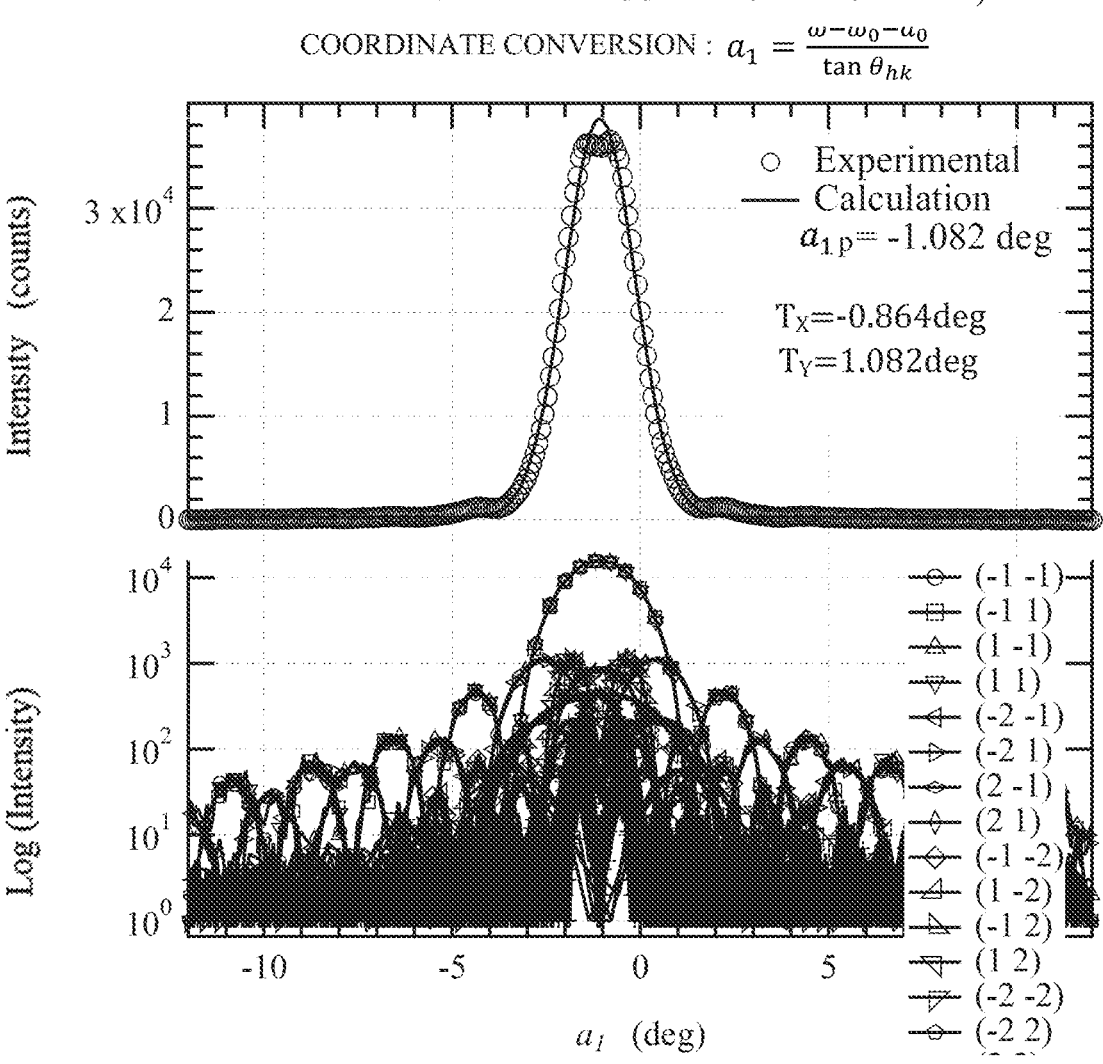
FIG. 23 illustrates a diffraction image subject to a single analysis and a graph showing $Q_Z$ waveforms based on the intensity for $a_1$ of diffraction points, respectively.

The sample used in Example 1 was subjected to a single analysis based on $a_0$ direction and $a_1$ direction. FIG. 21 is a diffraction image to be subjected to a single analysis. FIG. 22 are a diffraction image subject to a single analysis and a graph showing $Q_Z$ waveforms based on the intensity for $a_0$ of diffraction points, respectively. FIG. 23 are a diffraction image subject to a single analysis and a graph showing $Q_Z$ waveforms based on the intensity for $a_1$ of diffraction points, respectively. Note that $a_{0p}$ and $a_{1p}$ represent the peak positions of $a_0$ and $a_1$.

As the analysis result, −0.864 deg and 1.082 deg were obtained as $T_X$ of the X component of the tilt angle and $T_Y$ of the Y component of the tilt angle. The obtained results coincide with the results of Examples 1 and 2 with high accuracy.

Example 4

Figure 24:
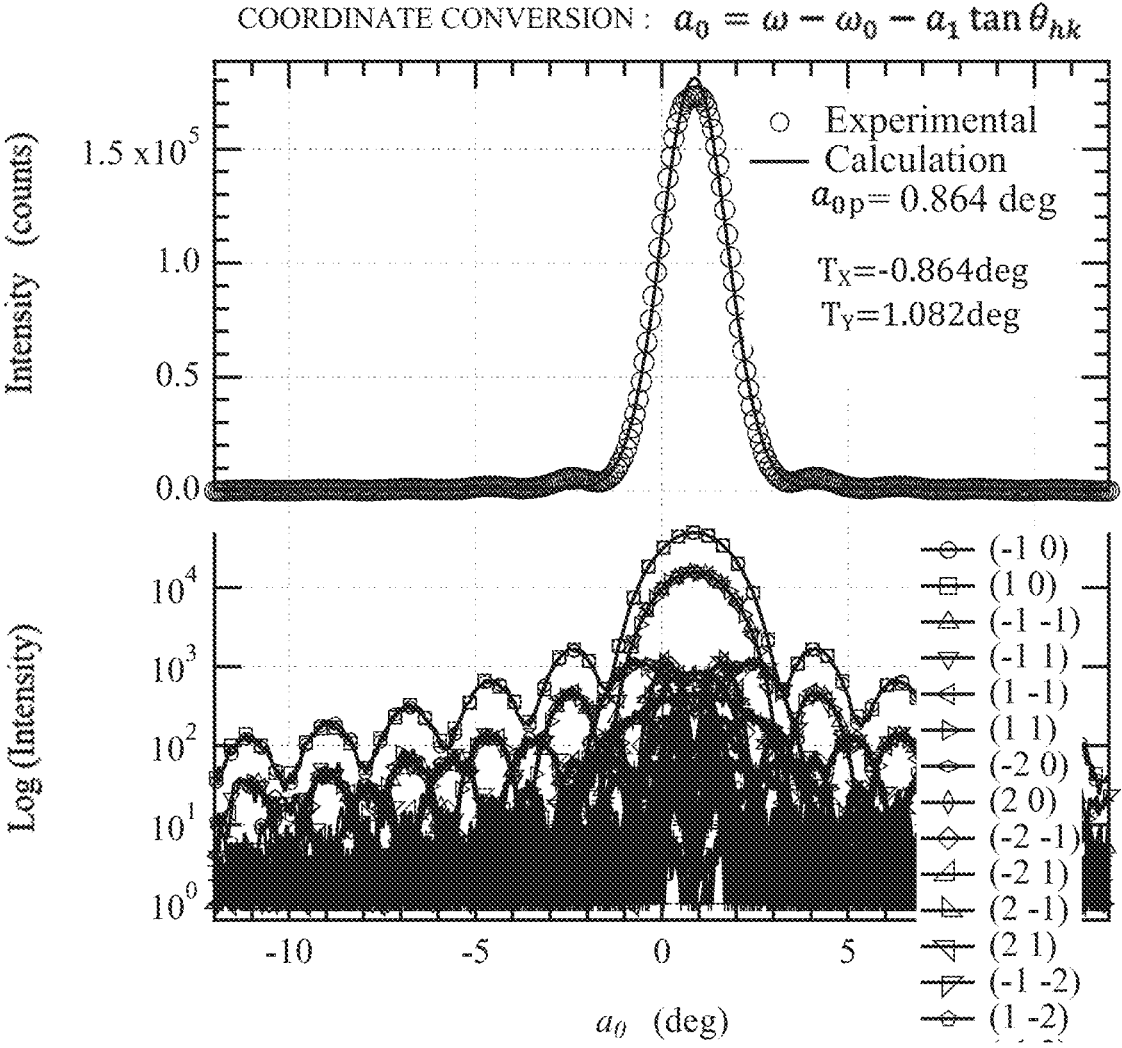
FIG. 24 illustrates a diffraction image subject to a loop analysis and a graph showing $Q_Z$ waveforms based on the intensity for $a_0$ of diffraction points, respectively.
Figure 25:
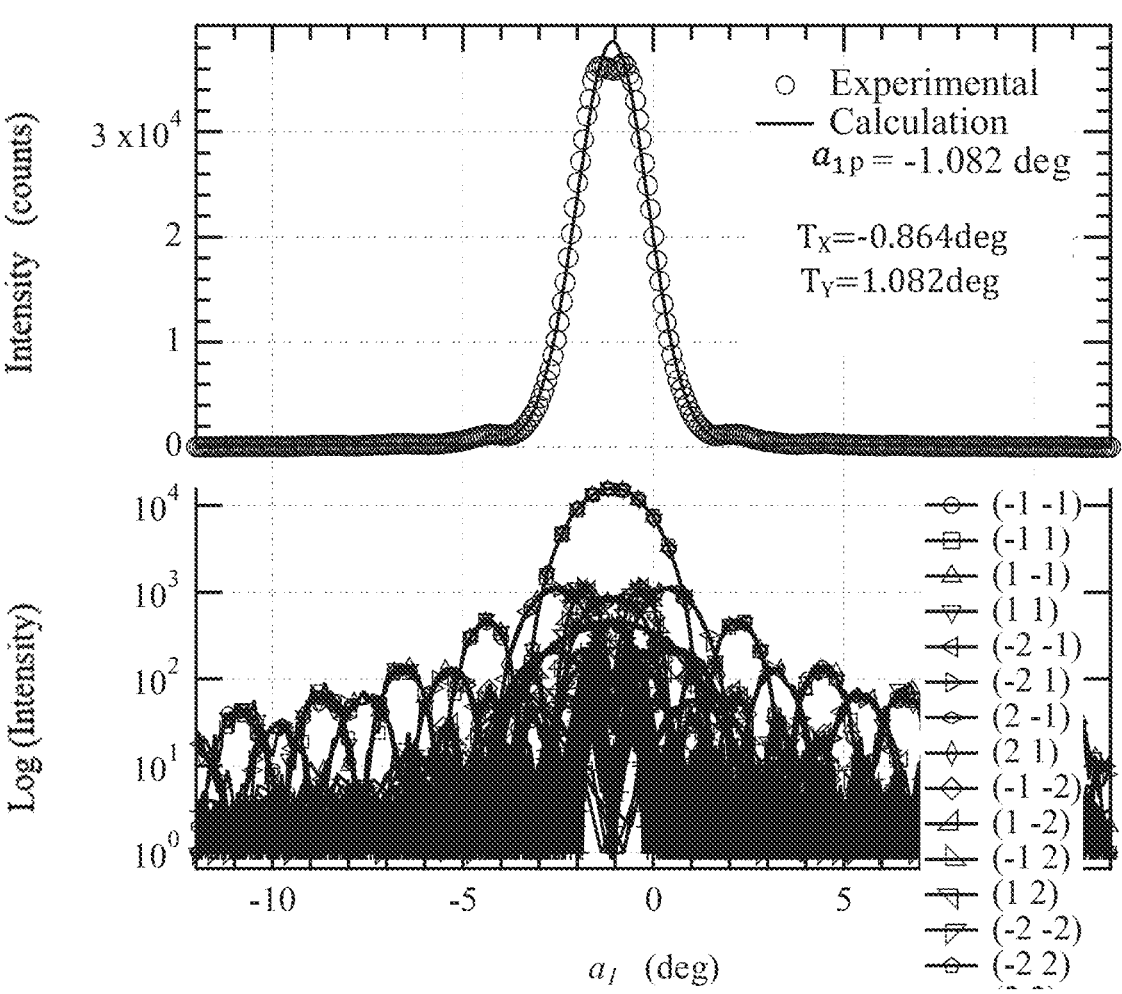
FIG. 25 illustrates a diffraction image subject to a loop analysis and a graph showing $Q_Z$ waveforms based on the intensity for $a_1$ of diffraction points, respectively.

The sample used in Example 1 was subjected to the loop analysis based on $a_0$ and $a_1$ directions. The diffraction image to be subjected for the loop analysis is the same as the diffraction image to be subjected to the single analysis. FIG. 24 are a diffraction image subject to a loop analysis and a graph showing $Q_Z$ waveforms based on the intensity for $a_0$ of diffraction points, respectively. FIG. 25 are a diffraction image subject to a loop analysis and a graph showing $Q_Z$ waveforms based on the intensity for $a_1$ of diffraction points, respectively.

In the loop analysis, the numerical values converged by 4 cycles. FIG. 24 and FIG. 25 show $Q_Z$ waveforms at 3.5th and 4th cycle, respectively. These are $Q_Z$ waveforms at convergence. −0.864 deg and 1.082 deg were obtained as $T_X$ of the X component of the tilt angle and $T_Y$ of the Y component of the tilt angle. The obtained results coincide with the results of Examples 1 and 2 with high accuracy.

What is claimed is:

1. An analysis apparatus for analyzing a fine structure of a plate-shaped sample formed to have columnar scattering bodies that are long in a thickness direction and periodically arranged, comprising:

processing circuitry configured to store data of a scattering intensity from the plate-shaped sample measured by transmission of X-rays in one $\omega$ scan, acquire a waveform of a scattering vector in the thickness direction of the plate-shaped sample at a specific diffraction point and perform coordinate conversion from the coordinate of the scattering vector in the thickness direction of the plate-shaped sample to the coordinate of the tilt of the scattering body, with respect to the waveform based on an intensity of the specific diffraction point on the two-direction components, using the data of the measured scattering intensity, specify a peak position of the waveform of the intensity with respect to the coordinate of the tilt applied the coordinate conversion, and calculate a difference between the specified peak position and the peak position obtained on the assumption that the scattering body is not tilted from the direction perpendicular to the surface of the plate-shaped sample, on the two-direction components of the tilt of the scattering body.

2. The analysis apparatus according to claim 1, wherein the processing circuitry is further configured to perform the coordinate conversion to the coordinate of the tilt of the scattering body on at least one of the two-direction components, by a single analysis using a diffraction point at which one of the two-direction components of the scattering vectors is 0.

3. The analysis apparatus according to claim 1, wherein the processing circuitry is further configured to perform the coordinate conversion to the coordinate of the tilt of the scattering body on the two-direction components, by a loop analysis using a diffraction point where none of the two-direction components of the scattering vectors is not 0.

4. The analysis apparatus according to claim 1, wherein the two-direction components correspond to components in X direction along with the unit cell and Y direction orthogonal to the X direction, both of the X and Y directions being parallel to the surface of the plate-shaped sample.

5. The analysis apparatus according to claim 1, wherein components correspond to the two-direction components in $a_0$ direction and being the scanning direction of the $\omega$-scan and a direction orthogonal to $a_0$ direction, both of the $a_0$ and $a_1$ directions being parallel to the surface of the plate-shaped sample.

6. The analysis apparatus according to claim 1, wherein the processing circuitry is further configured to use a waveform integrated over a plurality of diffraction points as a waveform based on an intensity of a two-direction component of the specific diffraction point.

7. An analysis method for a fine structure of a plate-shaped sample formed to have columnar scattering bodies that are long in a thickness direction and periodically arranged, comprising:

preparing data of a scattering intensity from the plate-shaped sample measured by transmission of X-rays in one ω scan;

acquiring a waveform of a scattering vector in the thickness direction of the plate-shaped sample at a specific diffraction point and performing coordinate conversion from the coordinate of the scattering vector in the thickness direction of the plate-shaped sample to the coordinate of the tilt of the scattering body, with respect to the waveform based on an intensity of the specific diffraction point on the two-direction components, using the data of the measured scattering intensity;

specifying a peak position of the waveform of the intensity with respect to the coordinate of the tilt applied the coordinate conversion; and calculating a difference between the specified peak position and the peak position obtained on the assumption that the scattering body is not tilted from the direction perpendicular to the surface of the plate-shaped sample, on the two-direction components of the tilt of the scattering body.

8. The method of claim 7, further comprising:

performing the coordinate conversion to the coordinate of the tilt of the scattering body on at least one of the two-direction components, by a single analysis using a diffraction point at which one of the two-direction components of the scattering vectors is 0.

9. The method of claim 7, further comprising:

performing the coordinate conversion to the coordinate of the tilt of the scattering body on the two-direction components, by a loop analysis using a diffraction point where none of the two-direction components of the scattering vectors is not 0.

10. The method of claim 7, wherein the two-direction components correspond to components in X direction along with the unit cell and Y direction orthogonal to the X direction, both of the X and Y directions being parallel to the surface of the plate-shaped sample.

11. The method of claim 7, wherein the two-direction components correspond to components in $a_0$ direction and being the scanning direction of the ω-scan and $a_1$ direction orthogonal to $a_0$ direction, both of the $a_0$ and $a_1$ directions being parallel to the surface of the plate-shaped sample.

12. The method of claim 7, further comprising:

using a waveform integrated over a plurality of diffraction points as a waveform based on an intensity of a two-direction component of the specific diffraction point.

13. A non-transitory computer readable recording medium having recorded thereon an analysis program for analyzing a fine structure of a plate-shaped sample formed to have columnar scattering bodies that are long in a thickness direction and periodically arranged, the program causing a computer to execute the following processes of:

preparing data of a scattering intensity from the plate-shaped sample measured by transmission of X-rays in one w scan;

acquiring a waveform of a scattering vector in the thickness direction of the plate-shaped sample at a specific diffraction point and performing coordinate conversion from the coordinate of the scattering vector in the thickness direction of the plate-shaped sample to the coordinate of the tilt of the scattering body, with respect to the waveform based on an intensity of the specific diffraction point on the two-direction components, using the data of the measured scattering intensity;

specifying a peak position of the waveform of the intensity with respect to the coordinate of the tilt applied the coordinate conversion; and calculating a difference between the specified peak position and the peak position obtained on the assumption that the scattering body is not tilted from the direction perpendicular to the surface of the plate-shaped sample, on the two-direction components of the tilt of the scattering body.

14. The non-transitory computer readable recording medium of claim 13, further comprising:

performing the coordinate conversion to the coordinate of the tilt of the scattering body on at least one of the two-direction components, by a single analysis using a diffraction point at which one of the two-direction components of the scattering vectors is 0.

15. The non-transitory computer readable recording medium of claim 13, further comprising:

performing the coordinate conversion to the coordinate of the tilt of the scattering body on the two-direction components, by a loop analysis using a diffraction point where none of the two-direction components of the scattering vectors is not 0.

16. The non-transitory computer readable recording medium of claim 13, wherein the two-direction components correspond to components in X direction along with the unit cell and Y direction orthogonal to the X direction, both of the X and Y directions being parallel to the surface of the plate-shaped sample.

17. The non-transitory computer readable recording medium of claim 13, wherein the two-direction components correspond to components in $a_0$ direction and being the scanning direction of the ω-scan and $a_1$ direction orthogonal to $a_0$ direction, both of the $a_0$ and $a_1$ directions being parallel to the surface of the plate-shaped sample.

18. The non-transitory computer readable recording medium of claim 13, further comprising:

using a waveform integrated over a plurality of diffraction points as a waveform based on an intensity of a two-direction component of the specific diffraction point.

* * * * *